US012648060B2

(12) United States Patent
Kumar

(10) Patent No.: US 12,648,060 B2
(45) Date of Patent: Jun. 2, 2026

(54) LOW-VOLTAGE LIGHTING SYSTEMS AND METHODS

(71) Applicant: DMF, Inc., Carson, CA (US)

(72) Inventor: Russikesh Kumar, Tustin, CA (US)

(73) Assignee: DMF, Inc.

( * ) Notice: Subject to any disclaimer, the term of this patent is extended or adjusted under 35 U.S.C. 154(b) by 65 days.

(21) Appl. No.: 18/903,729

(22) Filed: Oct. 1, 2024

(65) Prior Publication Data

US 2025/0098043 A1 Mar. 20, 2025

Related U.S. Application Data

(63) Continuation of application No. PCT/US2023/065292, filed on Apr. 3, 2023.

(60) Provisional application No. 63/326,527, filed on Apr. 1, 2022.

(51) Int. Cl.

| | |
|---|---|
| ***H05B 45/14*** | (2020.01) |
| ***H05B 45/24*** | (2020.01) |
| *H05B 47/175* | (2020.01) |
| *H05B 47/18* | (2020.01) |
| *H05B 47/19* | (2020.01) |

(52) U.S. Cl.

CPC ............. *H05B 45/14* (2020.01); *H05B 45/24* (2020.01); *H05B 47/18* (2020.01); *H05B 47/183* (2024.01); *H05B 47/19* (2020.01); *H05B 47/196* (2024.01); *H05B 47/199* (2024.01)

(58) Field of Classification Search

CPC ........ H05B 45/14; H05B 45/24; H05B 45/37; H05B 45/40; H05B 47/18; H05B 47/19; H05B 47/20; H05B 47/183; H05B 47/196; H05B 47/199; H02M 1/32; H02M 1/36; H02M 1/42

See application file for complete search history.

(56) References Cited

U.S. PATENT DOCUMENTS

| | | | | |
|---|---|---|---|---|
| 8,587,203 | B2 * | 11/2013 | Chen ...................... | H05B 45/54 315/307 |
| 2017/0311400 | A1 * | 10/2017 | Newman, Jr. .......... | H05B 45/38 |
| 2018/0123351 | A1 | 5/2018 | Andrews et al. | |
| 2020/0323073 | A1 | 10/2020 | Cartrette et al. | |
| 2021/0045221 | A1 | 2/2021 | DeJonge et al. | |
| 2022/0085610 | A1 | 3/2022 | DeJonge et al. | |
| 2023/0017092 | A1 * | 1/2023 | Fox .......................... | H02H 3/05 |
| 2023/0124433 | A1 * | 4/2023 | Yamane .................. | H02M 1/32 363/21.12 |

FOREIGN PATENT DOCUMENTS

WO 2022056180 A1 3/2022

OTHER PUBLICATIONS

International Search Report and Written Opinion in PCT/US 23/65292 dated Nov. 6, 2023, 31 pages.

* cited by examiner

*Primary Examiner* — Tung X Le
(74) *Attorney, Agent, or Firm* — Smith Baluch LLP

(57) ABSTRACT

Apparatus and methods for operating low-voltage lighting systems are described. Wiring hubs can reduce installation wiring complexity. A smart power supply can provide more than 100 watts of power on Class 2 low-voltage wiring to compliant loads and limit power delivery to 100 watts for non-compliant loads.

22 Claims, 10 Drawing Sheets

LOW-VOLTAGE LIGHTING SYSTEMS AND METHODS

CROSS-REFERENCE TO RELATED APPLICATIONS

The present application is a bypass continuation of International Application No. PCT/US2023/065292 filed on Apr. 3, 2023, titled "Low-voltage Lighting Systems," which claims a priority benefit, under 35 U.S.C. § 119(e), to U.S. provisional application Ser. No. 63/326,527 filed on Apr. 1, 2022, titled "Low-voltage Lighting Systems," which application is incorporated herein by reference in its entirety.

BACKGROUND

Conventional 120-volt wiring for residential and commercial lighting typically includes circuit breakers at one or more power panels to feed 120 V AC power to multiple switches in a building. The power panels typically receive 120 V or 240 V AC power and distribute 120 V AC power to the lighting fixtures. Each switch can control one or more lighting fixtures in one or more regions of the building by providing or prohibiting power flow (at 120 V) to their connected lighting fixture(s). Three-way and four-way light switches are used to control power to a same lighting fixture or group of fixtures from two or more points of control (e.g., at the top and bottom of a staircase). Conventional 120 V wiring must be installed in the building in accordance with Class 1 standards and local and/or national electrical codes which require listed cable types, junction boxes, power panels, and circuit breakers to be used. The installation requirements are intended to ensure safe installation and usage, reducing the risk of electrical shock or fire as a result of a fault or overload.

SUMMARY

Modern-day LED lighting fixtures can operate at significantly lower voltages (down to 12 V) and significantly lower electrical power (down to 10 W or less) than conventional incandescent and fluorescent lighting. As such, heavy wiring used for conventional 120 V AC lighting is no longer needed for LED-based lighting fixtures in residential, commercial, and other buildings and installation can and is currently being done under low-voltage, Class 2 standards. However, the inventor has recognized and appreciated that wiring of LED lighting fixtures under Class 2 standards can result in complex and unnecessary amounts (and cost) of wiring in a building.

In view of the foregoing, according to example inventive implementations discussed in further detail below, remote power supply hubs (referred to as wiring hubs) can be connected in a lighting system between a power panel and lighting fixtures to reduce wiring complexity in a building in which the lighting system is installed. Each remote power supply hub may contain one or more power supplies, wherein each power supply can connect to and provide power to one or more LED lighting fixtures in a region of the building according to Class 2 standards. The wiring hubs can connect to and receive power from power converters according to Class 1 standards, though in some cases Class 2 standards may be used.

In some cases, the wiring hubs include smart power supplies that are capable of providing more power than the value limited by Class 2 regulations, but only to registered or compliant devices under monitored conditions indicating that such power delivery is permitted. If any non-registered or non-compliant device connects to the smart power supply, then the smart power supply restricts power delivery to the limit set by Class 2 regulations.

By using remote power supply hubs according to the present disclosure, with or without smart power supplies, the number of wiring "home runs" to a power panel (a single cable from each lighting fixture back to a power source) can be reduced, decreasing costs associated with wiring time and materials for LED lighting fixtures.

Some implementations relate to a power supply comprising: a power source to output electrical current; an output terminal coupled to the power source to provide the electrical current to a device when the device is coupled to the output terminal to receive power from the power source; power metering circuitry to sense at least one of the electrical current or first electrical power delivered to the output terminal; and a controller communicatively coupled to the power metering circuitry and the power source. The controller can be configured to: determine a first amount that is indicative of the first electrical power delivered from the power source to the output terminal to power at least the device when the device is operating and coupled to the output terminal; compare the first amount to a second amount, wherein the second amount is indicative of second electrical power consumed by at least the device when the device is operating and coupled to the output terminal; and if the first amount differs from the second amount by more than a predetermined threshold amount, limit the first electrical power to a predetermined power level.

Some implementations relate to a method of operating a power supply. The method can include acts of: outputting electrical current with a power source; delivering, to an output terminal coupled to the power source, the electrical current to provide first electrical power to a device coupled to the output terminal; sensing, with power metering circuitry, at least one of the electrical current or the first electrical power delivered to the output terminal; determining, with a controller communicatively coupled to the power metering circuitry, a first amount that is indicative of the first electrical power delivered to the output terminal to power at least the device; comparing the first amount to a second amount, wherein the second amount is indicative of second electrical power consumed by at least the device; and if the first amount differs from the second amount by more than a predetermined threshold amount, limiting the first electrical power to a predetermined power level.

Some implementations relate to a lighting fixture comprising: an input terminal to receive power from a low-voltage power supply; an LED light source to emit light; an LED driver to provide current to the LED light source; a controller to control an amount of current provided by the LED driver to the LED light source; a transceiver communicatively coupled to the controller and to the input terminal; and power metering circuitry to measure a first amount indicative of electrical power consumed by at least the LED light source during operation of the lighting fixture, wherein the controller is configured to transmit a first signal via the input terminal that is indicative of the electrical power consumed by at least the LED light source during operation of the lighting fixture.

Some implementations relate to a method of operating a lighting fixture. The method can include acts of: receiving, at an input terminal, power from a low-voltage power supply; providing current, with an LED driver, to an LED light source; controlling, with a controller, an amount of the current provided by the LED driver to the LED light source;

emitting light with the LED light source; measuring, with power metering circuitry, a first amount indicative of electrical power consumed by at least the LED light source; and transmitting, with a transceiver communicatively coupled to the controller and to the input terminal, a first signal via the input terminal that is indicative of the electrical power consumed by at least the LED light source during operation of the lighting fixture.

Some implementations relate to a wiring hub for low-voltage LED lighting, the wiring hub comprising: an input to receive power according to a first power classification, the first power classification allowing more than 100 watts of power flowing into the input; a first power supply coupled to the input and coupled to a first output of the wiring hub to output power according to a second power classification, the second power classification allowing no more than 100 watts to the first output; a second power supply coupled to the input and coupled to a second output of the wiring hub to output power according to a second power classification, the second power classification allowing no more than 100 watts to the second output; and at least one transceiver communicatively coupled to the first output to transmit a signal received at the input to the output.

Some implementations relate to a method of distributing power for low-voltage LED lighting with a wiring hub. The method can include acts of: receiving, at an input of the wiring hub, power according to a first power classification, the first power classification allowing more than 100 watts of power flowing into the input; providing, with a first power supply coupled to the input and coupled to a first output of the wiring hub, output power according to a second power classification, the second power classification allowing no more than 100 watts provided to the first output; and providing, with a second power supply coupled to the input and coupled to a second output of the wiring hub, output power according to a second power classification, the second power classification allowing no more than 100 watts provided to the second output.

Some implementations relate to a communication coupler for an outdoor LED lighting system. The communication coupler comprises: an input to receive power from a transformer; a first transceiver to communicatively couple to an output low-voltage power line, the low-voltage power line configured to deliver power to at least one LED lighting fixture; a second transceiver to communicatively couple to an indoor lighting system; and a controller communicatively coupled to the first transceiver and the second transceiver. The controller can be configured to receive a first signal via the second transceiver; output a second signal via the first transceiver to change an intensity of light output from the LED lighting fixture in response to the first signal; receive a third signal via the second transceiver; and output a fourth signal via the first transceiver to change a color temperature of the light output from the LED lighting fixture in response to the third signal.

Some implementations relate to a method of operating a communication coupler for an outdoor LED lighting system. The method can include acts of: receiving, at the communication coupler, first power from a transformer; providing, to an output low-voltage power line, second power to at least one LED lighting fixture coupled to the low-voltage power line; communicatively coupling to the low-voltage power line with a first transceiver; communicatively coupling to an indoor lighting system with second transceiver; receiving, with a controller communicatively coupled to the first transceiver and the second transceiver, a first signal via the second transceiver; transmitting a second signal over the low-voltage power line, via the first transceiver, to change an intensity of light output from the LED lighting fixture in response to the first signal; receiving a third signal via the second transceiver; and transmitting a fourth signal over the low-voltage power line, via the first transceiver, to change a color temperature of the light output from the LED lighting fixture in response to the third signal.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

DETAILED DESCRIPTION

1. Low-Voltage Wiring Benefits and Drawbacks

Figure 1:
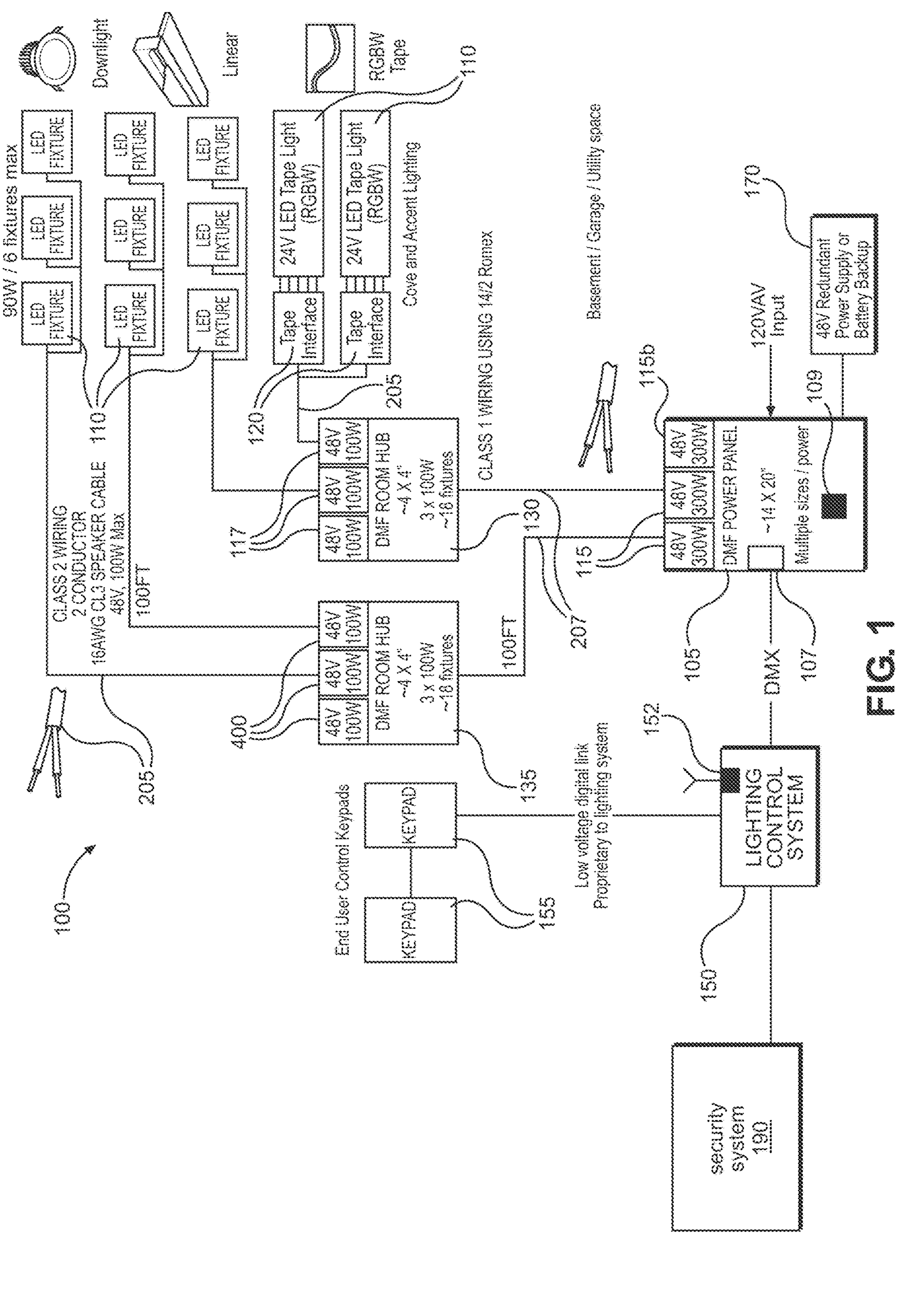
FIG. 1 depicts a lighting system for LED lighting fixtures that includes wiring hubs connected between a main power panel and the lighting fixtures.

The inventors have recognized and appreciated that low-voltage lighting is becoming more popular with the widespread adoption of light-emitting diodes (LEDs) for residential and commercial lighting applications. LEDs can provide color temperature control in addition to intensity control and lower energy consumption, all of which can be appealing to many users. Low-voltage systems can further use a power supply to reduce the conventional residential or commercial "mains" voltage of 120 VAC or 220 VAC (e.g., as supplied by a utility company) to 60 V DC and lower, moving low-voltage lighting circuits into a different electrical code class (NEC Class 2) from 120 V circuits (NEC Class 1). Keeping the operating voltages and available power within Class 2 limits provide safety against electrical shock and limits the potential for fire as a result of a fault or overload in a Class 2 wired system.

There are several benefits of lighting systems falling within the Class 2 limits. Such benefits include:

- Less restrictive wiring requirements permitting installation by low voltage installers.
- Lower cost wires and cables.
- Building codes do not require that splices be contained in junction boxes.
- Reduced safety certification requirements for devices powered with Class 2 wiring enable lighting fixtures with smaller form factors that can be made at lower cost.

Although such benefits exist for Class 2 systems, the inventors have recognized and appreciated that low-voltage lighting systems currently employed have been implemented with complicated wiring (mainly due to restrictions on voltage and power that can be carried on each power line), thereby making the installation less cost effective and more complex for the installer.

Some low voltage solutions such as power over ethernet (PoE) lighting systems use individual "home runs" (a single cable from each fixture back to a PoE power source). Thus, in a room with four lighting fixtures, there would be four cables, each running from the power source to a corresponding lighting fixture. These multiple home runs can result in a significant increase in the amount cable required for some lighting installations, compared to running a single home run cable that connects to the four lighting fixtures at different locations along the cable.

Some low-voltage lighting systems employ a constant current driver that can permit multiple LED lighting fixtures to be connected in series along a single power line. However, Class 2 constraints limit the maximum power on the power line to 100 watts, which can limit the number of lighting fixtures on the power line. Given the typical voltage drop of LED lighting fixtures, the installer is often required to calculate if they can install one, two, or three fixtures in series along a single power line. An undesirable aspect of such a serial installation is that if a single LED fails on the power line, others on the power line will also stop functioning.

2. Low-Voltage Lighting System Components

FIG. 1 depicts one example of a lighting system 100 that can reduce complexity of wiring for low-voltage lighting. The lighting system can include power panels 105, LED lighting fixtures 110, constant voltage interfaces 120, wiring hubs 130, 135, and a control system 150 for a user to operate the lighting system 100. The power panel 105 and/or wiring hubs 130, 135 can include low-voltage supplies 115, 117, 400 to provide low-voltage power to the LED lighting fixtures 110. Some of the low-voltage supplies 115 can convert power from one form (e.g., 120 V AC, 2400 W maximum) to another form (e.g., 48 V DC, 300 W maximum, though other voltages and power levels are possible such as up to 400 V DC and up to 500 W or more). Low-voltage wiring 205 can run between lighting fixtures 110 and wiring hubs 130, 135, and in some cases between wiring hubs 130, 135 and power panels 105.

The control system 150 can comprise a microprocessor, microcontroller, and/or other data processing circuitry configured or configurable with machine-readable instructions to control LED lighting fixtures 110 in the lighting system 100 in response to user-issued commands. At least one of light on/off status, light intensity, and light color for at least one LED lighting fixture 110 can be controlled via the control system 150. Accessing and operating the control system 150 can be done through one or more user interface devices 155 such as keypads and/or touchscreens, though other user interface devices can be used. The control system 150 can include a wireless transceiver 152 to wirelessly link to and operate the control system 150. Examples of other lighting system components are described in further detail below.

2A. LED Lighting Fixtures

Figure 2:
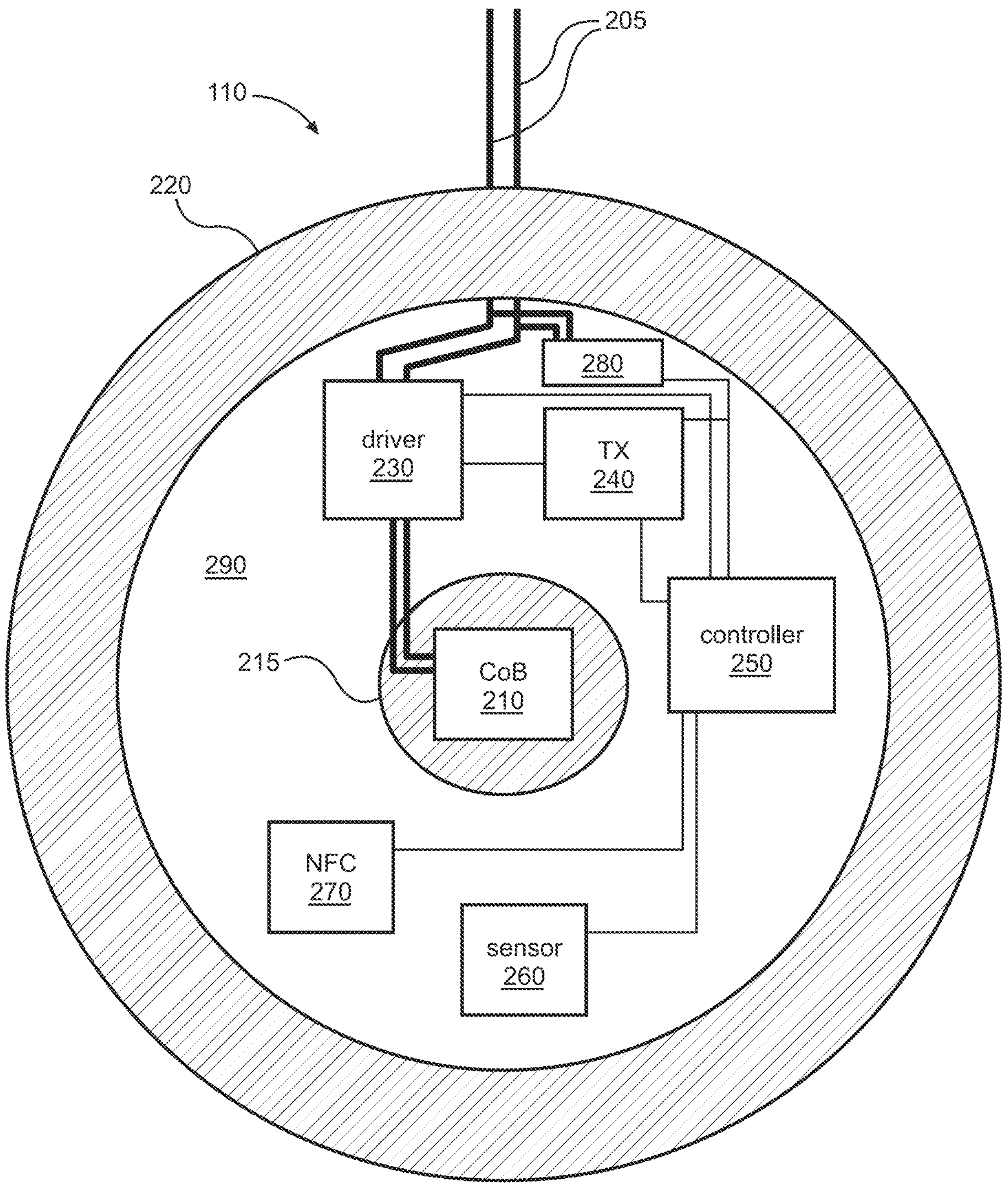
FIG. 2 depicts an example of a lighting fixture that can be used in the lighting system of FIG. 1.

LED lighting fixtures 110 can include, but are not limited to, LED downlights (which can be recessed), LED tape lighting, LED spotlights, and LED lighting fixtures having linear form factors (which may or may not be recessed). FIG. 2 depicts example components of an LED lighting fixture 110, which are included in a downlight. An LED lighting fixture 110 can include an LED light source 210 which can be implemented as one or more chip-on-board (CoB) LED sources. In some cases, a multi-color two or three-channel CoB LED source or multiple discrete LEDs arranged on a printed circuit board (PCB) can be used to provide tunable color temperature and adjustable intensity. The LED lighting fixture 110 can further include an optical assembly for focusing (e.g., collimating) and/or diffusing the light from the LED source(s) and a heatsink assembly 215 to dissipate heat from the LED source(s). The optical assembly can be located over and optically coupled to the LED light source 210. The optical assembly can be any optical assembly described in international patent application No. PCT2018/052996, titled "Folded Optics Methods and Apparatus for Improving Efficiency of LED-Based Luminaires," filed Sep. 26, 2018 and in international patent application No. PCT2020/039728, titled "Optical Element for Improving Beam Quality and Light Coupling Efficiency," filed Jun. 26, 2020, which applications are incorporated by reference in their entirety.

An LED lighting fixture 110 can further include a housing 290 to retain components of the LED lighting fixture 110 (e.g., support at least the LED light source 210 and the heatsink assembly 215). The housing 290 may additionally support the optical assembly. The LED lighting fixture 110 can further include trim 220, which may serve as an aesthetic element and may further provide means to mount the LED lighting fixture 110 and/or support the optical assembly within the LED lighting fixture 110. In some cases, there can be additional or alternative hardware to mount the fixture to the building structure. Examples of mounting hardware can include spring clips to attach to a housing or mousetrap springs to attach directly to the sheet rock.

The LED lighting fixture 110 can further include an LED driver 230 designed to regulate the current through the LED source(s) within the LED lighting fixture. The LED driver 230 can receive power from a low-voltage supply 117 (e.g., a 48 V DC power converter) via low-voltage wiring 205. The LED driver 230 can include a DC:DC power converter, such as a switching power supply arranged in a buck topology with constant current regulation, though other power supply circuitry is possible.

The LED lighting fixture 110 can further include a transceiver 240 circuit to receive and transmit data over the low-voltage wiring 205 for controlling lighting provided by the LED lighting fixture. The transceiver 240 can also be used to transmit information about operation of the LED lighting fixture 110 to the control system 150. The transceiver 240 may couple digital data onto the low-voltage wiring 205 via an inductor and capacitor network. An example transceiver is the DMX250 available from Yamar Electronics of Tel Aviv, Israel which couples high frequency data onto the DC powerline. The transceiver 240 can also receive data coupled to and received over the DC low-voltage wiring 205.

The transceiver 240 can be in communication with a controller 250 (e.g., microcontroller, microprocessor, FPGA, programmable logic circuit, or other data processor) within the LED lighting fixture 110. The controller 250 can be in communication with the LED driver 230 and can control the LED driver to adjust the current flowing through the LED source(s) 210 in response to control signals received via the transceiver 240. By adjusting current flow, brightness and optionally the color or color temperature from the lighting fixture 110 can be controlled in response to the control signals received via the transceiver 240.

In some cases, the controller 250 can interface with one or more LED drivers 230 in the LED lighting fixture 110 using one or more PWM outputs to control current flow. For example, the duty cycle of a first PWM waveform output by the controller 250 can set the output current for a specific channel that can control one or more LEDs of a first color. For example, the first PWM waveform can be provided to the LED driver 230 to control an amount of red light emitted from red LEDs in the LED source 210. A second PWM waveform from the controller 250 can be provided to the same LED driver 230 or a different LED driver to control an amount of blue light emitted from blue LEDs in the LED source 210. LEDs of different colors can be controlled in this way to adjust intensity and color of light emitted from the LED lighting fixture 110. Multiple PWM channels supported by the controller 250 can be used to control multiple LED drivers 230 and/or multiple channels of a single driver 230 differently from each other.

In some implementations, the LED lighting fixture 110 can also contain one or more sensors 260 such as at least one of a motion sensor, an ambient light sensor, a microphone, a temperature sensor, an air-quality sensor, or some combination thereof. Data from the sensor(s) 260 can be sampled by the controller 250 and transmitted over the low-voltage wiring 205 to the control system 150 or can be acted upon by the controller to control the LED lighting fixture's state directly. An example may be to turn on the LED lighting fixture 110 from an off state if the sound of a smoke detector alarm is detected.

The LED lighting fixture 110 described above can provide advantages over conventional lighting fixtures. Some advantages are listed below.

- The LED lighting fixture 110 can have a smaller form factor that conventional 120 V lighting fixtures and operate with a low voltage input (e.g., 60V or less). Requirements for housings and splice compartments are eliminated or significantly reduced as no 120 V, 15 amp line voltage is present. The size of electronics used in the LED lighting fixture 110 is small allowing the fixture's components to fit in a more compact space.
- Improved power efficiency can be attained by including a DC:DC conversion stage in the LED lighting fixture 110 compared to an AC:DC conversion stage. Efficiency can improve from about 80% to 90% or more using a DC low voltage input.
- Higher reliability and longer operational life are attained by removing the AC:DC power conversion stage.
- The fixture is less likely to suffer failure from line voltage surges compared to fixtures containing AC:DC power converters.

2B. Microcontroller

Figure 3A:
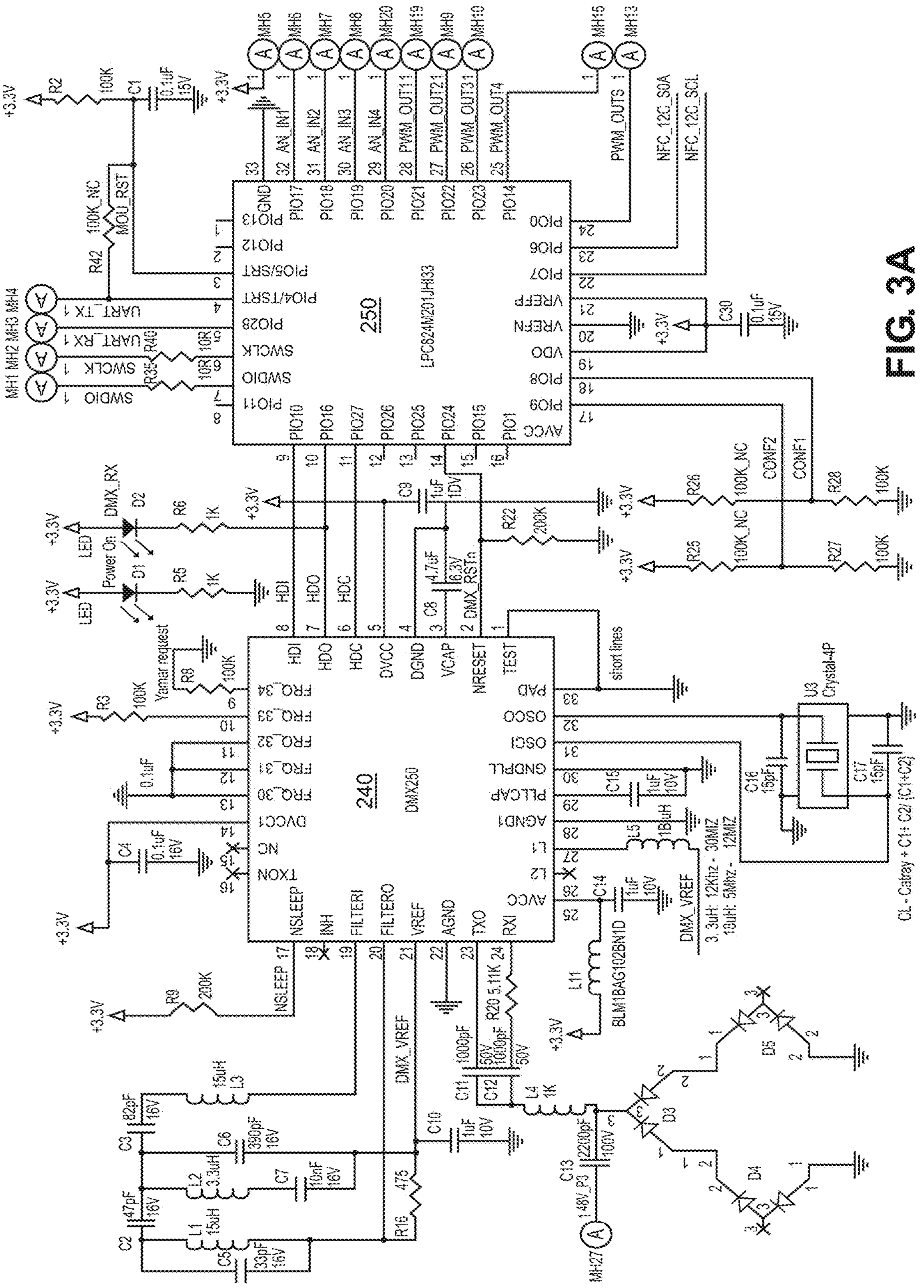
FIG. 3A is a circuit schematic of a microcontroller and transceiver that can be included in the lighting fixture of FIG. 2.

FIG. 3A depicts a circuit schematic for a controller 250 (implemented with a microcontroller) and transceiver 240 that can be used in an LED lighting fixture 110. The transceiver 240 can be communicatively coupled to the controller 250 as depicted in the illustrated schematic. Among other things, the controller 250 can send and receive data to and from the transceiver 240 via a serial UART connection over signal lines labeled "HDI" and "HDO" in the drawing. The controller 250 can also provide multiple PWM outputs (on signal lines labeled "PWM_OUT1," "PWM_OUT2," . . . "PWM_OUT5" in the drawing) to drive the LED driver(s) 230 or different LED driver channels. The controller 250 can include multiple analog inputs (signal lines labeled "AN_IN1," "AN_IN2" . . . "AN_IN4" in the drawing) to receive signals from one or more sensors 260 in the lighting fixture 110. An example microcontroller that can be used for the controller 250 is the LPC824M201JHI33 microcontroller available from NXP Semiconductors of Eindhoven, Netherlands.

2C. Communication Electronics

Figure 3B:
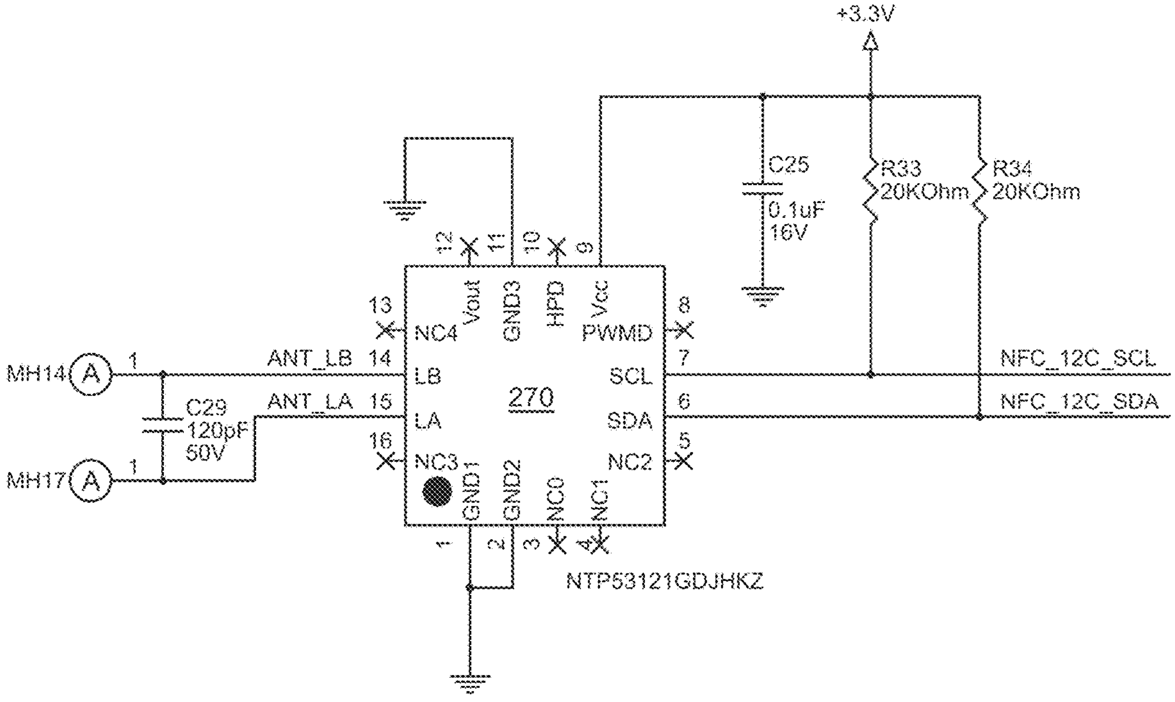
FIG. 3B is a circuit schematic of a near-field communication chip that can be included in the lighting fixture of FIG. 2.

The controller 250 can also be communicatively coupled to a near-field communication (NFC) chip 270, an example of which is illustrated in FIG. 3B. In some implementations, the NFC chip 270 can include EEPROM which allows configuration parameters (e.g., minimum on intensity, lighting color) of the lighting fixture 110 to be set using an NFC-equipped device such as a mobile phone. An example NFC chip 270 is the NTP53121G0JTZ chip available from NXP Semiconductors of Eindhoven, Netherlands.

The transceiver 240 can provide communicative coupling to external devices over the low-voltage wiring 205 that carries power to operate the lighting fixture 110. For example and referring to FIG. 3A, the transceiver 240 can couple to the low-voltage wiring 205 (e.g., 48 V DC wiring) via at least one inductor (L4) and one or more capacitors (C11 and C12) for sending and receiving signals. An example transceiver chip is the DMX250 manufactured by Yamar Electronics of Tel Aviv, Israel, though other transceivers can be used for the lighting fixture 110.

2D. Power Supply

In some implementations, the transceiver 240 and controller 250 can be powered with power from a low-voltage supply (e.g., 3.3V). A switched-mode power supply 280 and associated components can be included in the lighting fixture 110 to provide 3.3V power to the transceiver 240 and controller 250. An example circuit for the low-voltage power supply 280 is illustrated with the schematic of FIG. 3C. An example converter chip that can be used in the low-voltage power supply 280 is the SGM6061 high-frequency buck converter chip available from SG Micro of Beijing, China.

2E. LED Driver

Figure 3C:
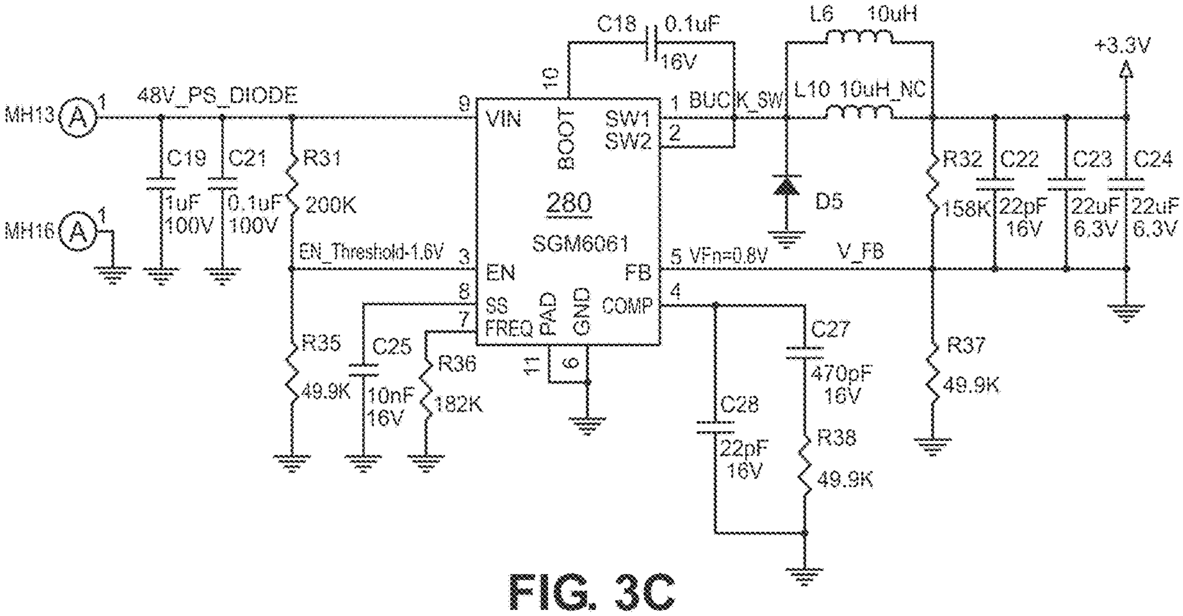
FIG. 3C is a circuit schematic of a power supply that can be included in the lighting fixture of FIG. 2 to power the microcontroller and transceiver of FIG. 3A.
Figure 3D:
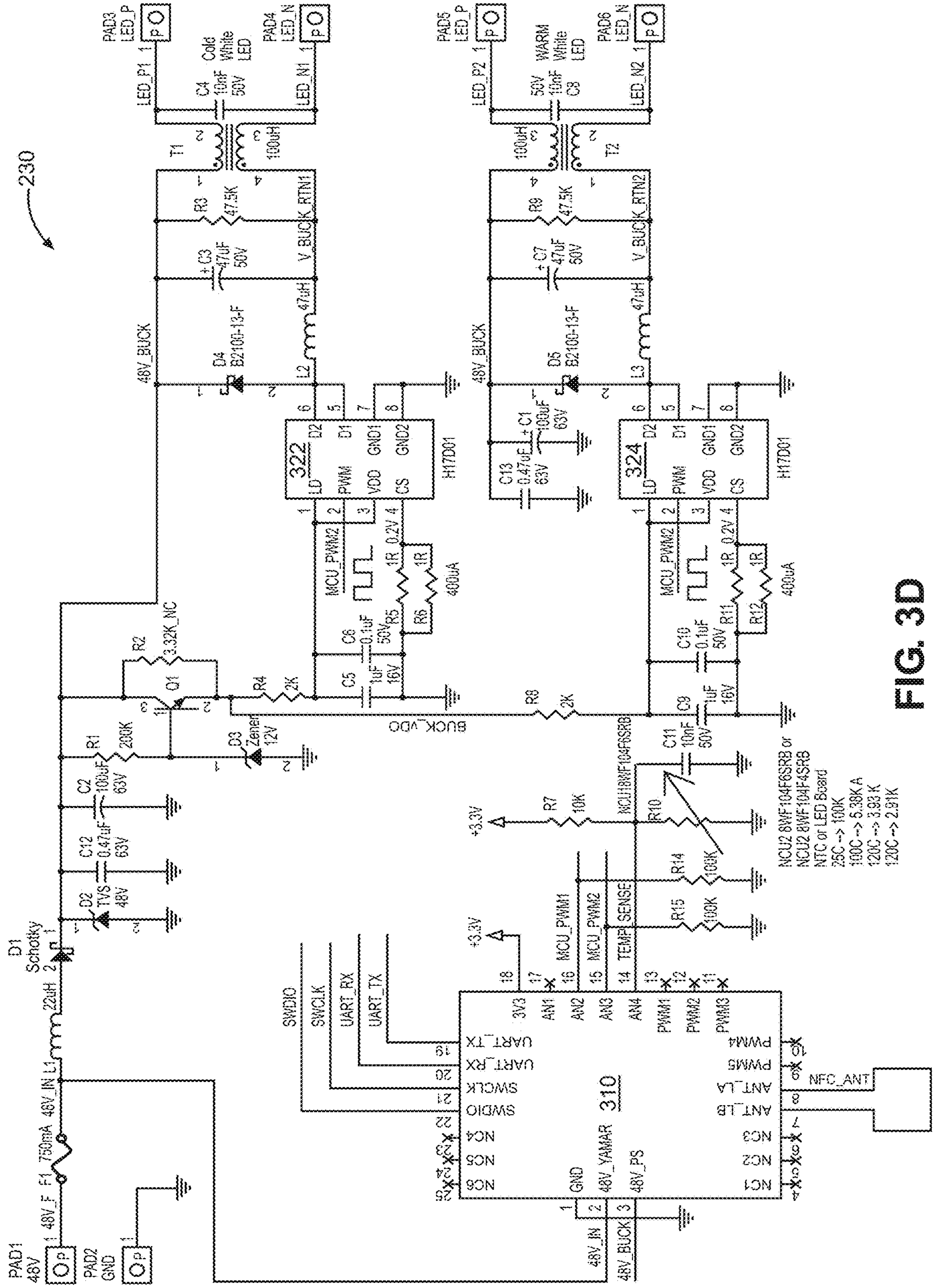
FIG. 3D is a circuit schematic that includes two power supplies to control two LED light sources in a lighting fixture of FIG. 2.

The schematic of FIG. 3D illustrates an example of circuitry for the LED driver 230 and includes peripheral circuitry that can be used to drive one or more LED sources 210 in an LED lighting fixture 110. Low-voltage wiring 205 (e.g., wiring carrying 48 V and 100 W maximum power) can electrically connect to the LED lighting fixture 110 at PAD1 (48V+) and PAD2 (GND) of the schematic. A Diode D1 protects against input wires being connected with reversed polarity.

Block 310 encompasses the peripheral circuitry of FIG. 3A, FIG. 3B, and FIG. 3C. The LED driver 230 can include two regulators 322, 324 that can be buck regulators configured for constant current control. Regulator 322 operates with diode D4, inductor L2, and capacitor C3 to regulate the voltage applied to the output terminals (PAD3 and PAD4). The voltage is regulated to deliver the current specified by resistor network R5 and R6 to flow through a first LED source (e.g., LEDs of a first color or first color temperature in LED source 210) connected to output pads (PAD3 and PAD4). In some implementations, the first LED source connected to this regulator can operate at a cool color temperature (e.g., with a color temperature in the range from 3000K to 5000K). Regulator 324 can be configured the same as regulator 322, but work with diode D5, inductor L3, capacitor C7, and resistors R11 and R12 to deliver current to a second LED source connected to PAD5 and PAD6. The second LED source can operate at a different second color or color temperature (e.g., a warm color temperature in the range from 1500K to 2200K).

The controller 250 can control the amount of current through each LED source connected to the regulators 322, 324 by adjusting the duty cycles on each of two PWM waveforms applied to the regulators 322, 324. A first PWM waveform (PWM1) can be applied to pin 2 of the first regulator 322 and a second PWM waveform (PWM2) can be applied to pin 2 of the second regulator 324. The duty cycles (ratio of ON to OFF times) in the cyclical PWM waveforms applied to the two regulators 322, 324 determines the relative amounts of current supplied to each LED source in the lighting fixture 110 and thereby controls the ratio of intensities in their light outputs that mix together when emitted from the lighting fixture 110. This mix of different color temperature emissions can determine the resulting color temperature emitted by the lighting fixture 110. The duty cycles can also determine the brightness of emission from the lighting fixture 110 by controlling the total ON time for each different color source of the LED source(2) 210.

Figure 3E:
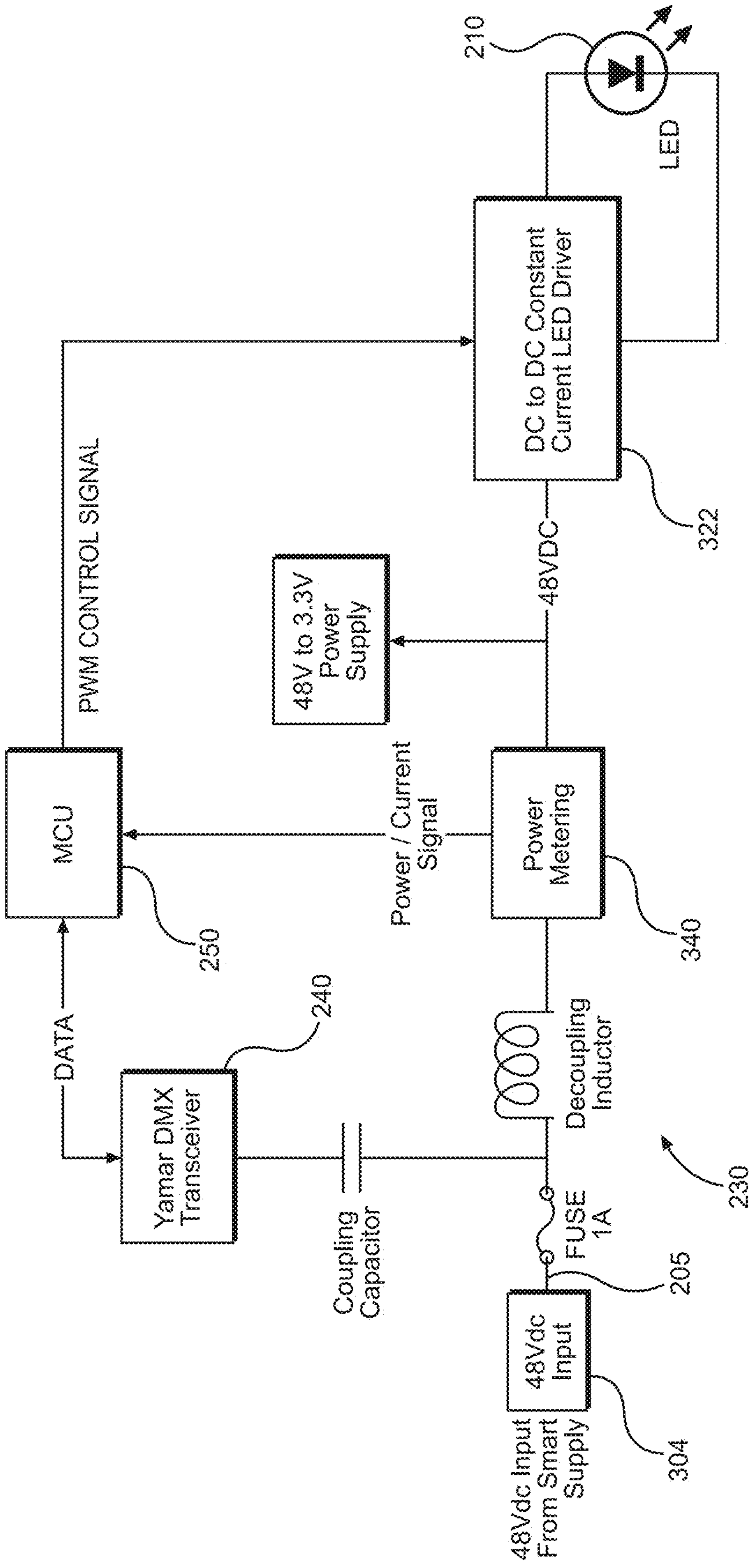
FIG. 3E depicts an example of circuitry for a smart lighting driver circuit that can be used in combination with a smart power supply of FIG. 4.

FIG. 3E depicts an example of a smart LED driver 230 that can be used to provide current and power to an LED source 210 in a lighting fixture 110 of FIG. 1. Power to operate the LED driver 230 and LED source 210 can be received at a low-voltage input terminal 304 from a smart power supply 400 (described below), for example. The controller 250 can monitor power and/or current delivered to the regulator 322 with power or current metering circuitry 340, for example, and communicate the information back to a smart power supply via the transceiver 240 and low-voltage wiring 205 connected to and delivering power to the LED driver 230. The smart power supply can be used as a low-voltage supply 117 in the lighting system 100 of FIG. 1.

The real-time amount of current and/or power being consumed by the lighting fixture 110 can be sensed using conventional measurement methods such as, but not limited to, a shunt resistor, hall effect sensor, or measuring a voltage drop across an in-line resistance of low value. In some cases, the controller 250 estimates the amount of power consumed by the LED source 210 based on the amount of current sensed. For example, the amount of current delivered to the LED source(s) 210 (and monitored by the controller) can be multiplied by the forward voltage drop across the LED(s) to estimate power consumed by the LED driver 230. The estimate can include power consumption by other components in the smart LED driver 230 (e.g., typical power consumption by the controller 250, transceiver 240, etc.). In some implementations, the controller 250 can estimate power consumption based on known operating characteristics of the LED source 210, such as light output detected by a sensor 260. For example, intensity and/or color output from the LED source(s) can be indicative of an amount of current provided to the LED source(s) 210. The current and/or power consumption information can be provided to the smart power supply to implement safe power metering, described further below.

2F. Constant Voltage Interface

Referring again to FIG. 1, the lighting system 100 also includes constant voltage interfaces 120 that can be connected between one or more LED lighting fixtures 110 and a wiring hub 130. In some implementations, a constant voltage interface 120 can provide means to control standard 12 V or 24 V LED tape lights, for example. LED tape lighting can be used for red-green-blue lighting applications and often uses a 12 V or 24 V supply that is switched on and off with a duty cycle. The duty cycle of the resulting 12 V or 24 V waveform determines the brightness of the connected LED tape light(s).

Figure 3F:
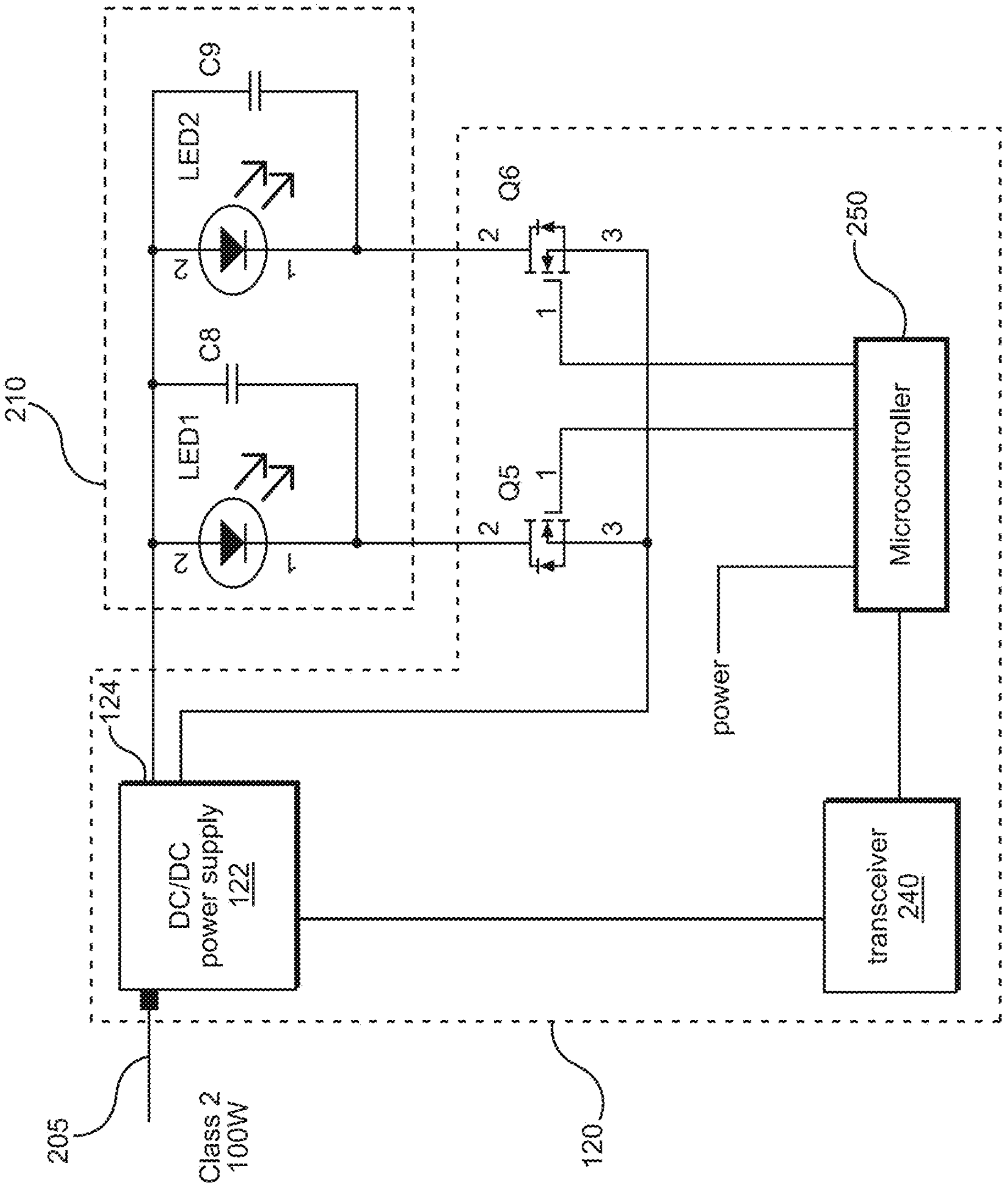
FIG. 3F depicts an example of circuitry for a constant voltage interface.

FIG. 3F illustrates one example of circuitry that can be included in a constant voltage interface 120. The constant voltage interface 120 can include a DC:DC switching power supply 122 to convert the incoming low-voltage source (e.g., 48 V) to a 24 V or 12 V waveform. The interface 120 can further include a positive output terminal 124 to provide 12 V or 24 V to the positive end (anode side) of the LED tape light(s) and one or more open collector transistors or FETs Q5, Q6 at one or more outputs that provide the return path(s) for current returning from the connected LED tape light(s). The constant voltage interface 120 can also include a transceiver 240 to receive and transmit data over the low-voltage wiring 205 coming from the remote wiring hub 130, 135 and a controller 250 to control the duty cycle of the open collector transistor(s) or FET(s) and affect the brightness and optionally the color or color temperature in response to messages received via the transceiver.

Conventionally, LED tape lights have required a large AC-powered LED driver with multiple constant voltage outputs to be in close proximity to the LED tape lights. This requirement presents installation difficulty in running line voltage wiring into tight trim and cove spaces. In another approach, the AC-powered LED driver is mounted remotely, and multiple low-voltage wires are run to the LED tape light. This approach presents additional difficulty as it requires the AC-powered LED driver to be mounted in a closet, for example, and increases issues related to voltage drop and noise generation.

By using a constant voltage interface 120, a 2-conductor, low-voltage power line 205 or cable can be used, such as a low cost and small gauge wire pair (18 AWG) compared to larger wires used for 120 V AC power delivery. The constant voltage interface 120 also mitigates the voltage drop issue associated with remote mounting of the AC-powered LED driver, because the current draw at 48 V is less than that at 24 V or 12 V. Additionally, the constant voltage interface 120 (which can include a switching power supply) can regulate the generated 12 V or 24 V even if the incoming 48 V is reduced by 10% or more due to voltage drop.

Because low voltages are used, the constant voltage interface 120 can be implemented with a small form factor box that can convert the 48 V received from the low-voltage wiring into one or more 24 V or 12 V constant-voltage PWM waveforms for multi-channel control.

2G. Wiring Hub

Figure 3G:
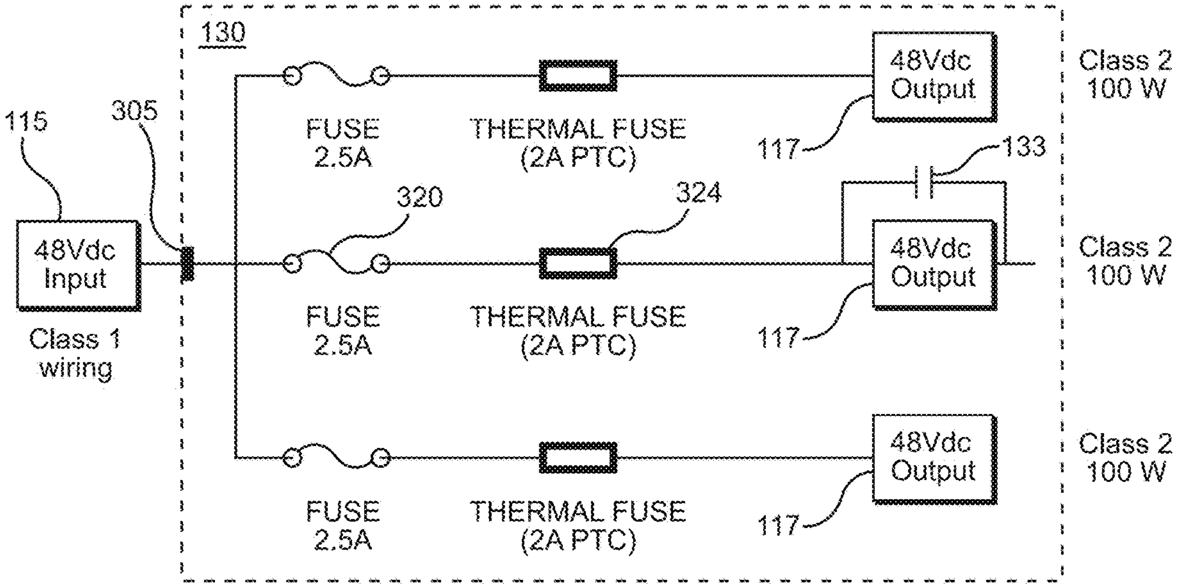
FIG. 3G depicts an example of circuitry for a wiring hub that can be used in the lighting system of FIG. 1.
Figure 3H:
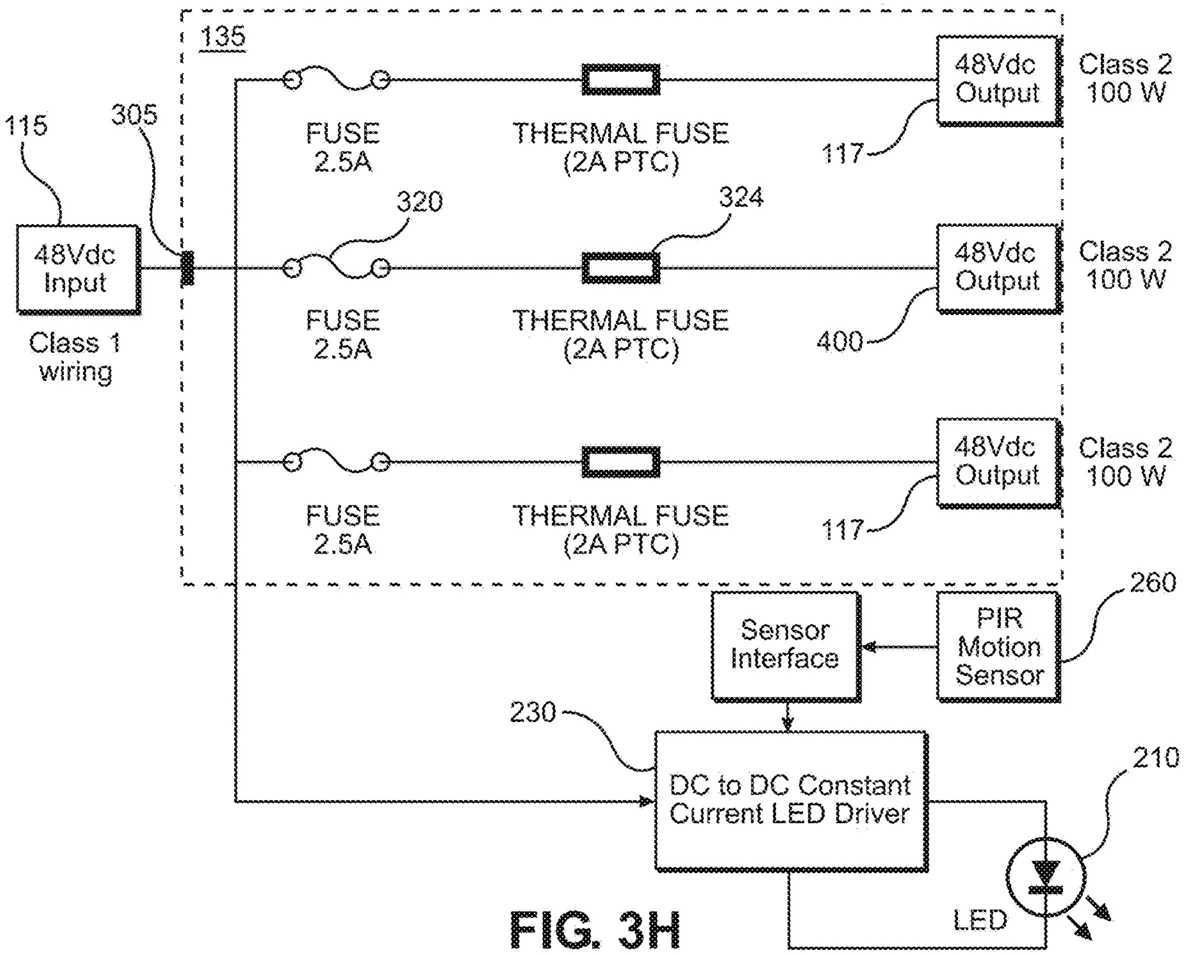
FIG. 3H depicts an example of circuitry for a wiring hub that includes a light source and that can be used in the lighting system of FIG. 1.

The lighting system 100 can include one or more wiring hubs 130, 135 that can distribute power to the lighting fixtures 110 using Class 2 wiring. For some installations, there may be one or more wiring hubs 130, 135 in a region or room of a building connected to one or more lighting fixtures 110 in the region or room. The wiring running from the hub 130, 135 to a lighting fixture 110 or constant voltage interface 120 can be commonly available 2-conductor, low-voltage cabling, speaker wire, doorbell wire or any other wiring permitted for Class 2 installations. Examples of such wiring include, but are not limited to 18 AWG or 16 AWG wire. FIG. 3G and FIG. 3H depict example circuits for wiring hubs 130, 135.

A wiring hub 130 can include a low voltage input (e.g., 60 V or less) that may be considered a Class 1 or Class 2 input depending on the amount of power delivered to the wiring hub 130. In some cases, the input is considered Class 1 if the power delivered to the hub exceeds the 100 W upper limit applied to Class 2 products. In the example implementation of FIG. 1, the input power received by the wiring hub 130 can be 48V DC and up to 300 W or higher power, which can be received from a power panel 105 via Class 1 wiring, such as Romex 12/2 cabling.

The wiring hub 130, 135 can further include low-voltage supplies 117, 400 to deliver power to one or more lighting fixtures 110. Each low-voltage supply 117 can be compliant with Class 2 standards (e.g., providing 60 V or less voltage and not more than 100 W). In some implementations, at least one of the low-voltage supplies 400 can be a smart power supply (described below in connection with FIG. 4) capable of safely delivering more than 100 W under monitored conditions.

In some implementations, a wiring hub can have from 2 to 6 low-voltage supplies 117, each capable of delivering up to 100 W (or more under monitored conditions) of Class 2 power. In some cases, a wiring hub can have more than six low-voltage supplies 117, 400. Multiple LED lighting fixtures 110 can be wired in parallel to any one low-voltage supply 117, 400 of a wiring hub 130. There can be up to six or more LED lighting fixtures 110 connected to each low-voltage supply 117, 400 of the wiring hub 130 while remaining below the 100 W upper power limit constraint on each output set by Class 2 regulations. For example, up to ten lighting fixtures 110 drawing no more than 10 W each could connect to one low-voltage supply 117 of a wiring hub 130. More lighting fixtures 110 may connect to a smart low-voltage supply 400.

The wiring hub 130 can further include power limiting and protection circuits (e.g., current-limiting fuses 320 and/or thermal fuses 324) connecting between the hub's input 305 and low-voltage supplies 117, 400. The limiting and protections circuits can ensure that the available power on any one output is less than the 100 W upper limit and that the wiring hub is operating at safe temperature levels, allowing the outputs to comply with Class 2 regulations.

There can be one or more transceivers within the wiring hub 130 to receive communication signals on the low-voltage input 305 and to pass the signals through to the one or more outputs from the hub's low-voltage supplies 117, 400. The signals may or may not include data. In some cases, the signals may be passed through directly (e.g., coupled from the input 305 to the output without using a transceiver). A signal-coupling circuit 133, that bypasses the low-voltage supply, can be used to route a signal from the input 305 to an output, as depicted in FIG. 3G. Alternatively, the signals may be received by a transceiver 240 within the wiring hub 130 and coupled to the low-voltage input, processed within the hub by signal processing circuitry (e.g., digital repeater, filtering circuitry, microcontroller, digital signal processor, etc.), and retransmitted from output(s) of one or more of the low-voltage supplies 117, 400 to improve the signal quality received by the lighting fixture(s) 110. In such implementations, the wiring hub 130 can include circuity to receive, process, and transmit signals.

The wiring hub 130 can have a small form factor and may be designed to fit in a convenient space within the home that permits easy wiring but does not create an aesthetic eyesore. For example, the wiring hub 130 may be designed to fit within a small enclosure that is sized to fit in and/or over a standard 3/O-4/O ceiling junction box. The junction box may be installed within closet spaces in the home and/or mounted above a doorway so as not to be immediately visible to the occupants. Wiring from the power panel 105 and wiring from the lighting fixtures 110 can be routed to the junction box and connect to terminals in the wiring hub 130 via screw terminals or other connection means.

In some implementations, the wiring hub 130 can include at least one LED lighting source 210 and at least one sensor 260. As such, the wiring hub 130 can further serve as a lighting fixture (e.g., automatically turning on to provide light when motion is detected). The wiring hub 130 of FIG. 3H includes an LED light source 210 that can be turned on by a signal from a proximity or motion sensor 260 and sensor interface to activate the LED driver 230. Such a circuit could be used in a closet or other low-light level area. In some cases, the wiring hub 130 can be embedded within or mounted in any room as a lighting fixture, while still allowing access for servicing or replacement and for wiring or rewiring lighting in the room or region of a building. The wiring hub 130 may have an appearance that is the same as that of other lighting fixtures 110 within the room, so that it is unnoticed.

2H. Power Panel

Referring again to FIG. 1, a power panel 105 can provide an interface between Class 1, 120 V AC wiring (from a line supply) and low-voltage DC wiring that connects the power panel 105 to one or more wiring hubs 130. There can be one or more power panels 105 within a building. In some implementations, the power panels 105 include low-voltage supplies 115 that convert line voltage to a low-voltage, lower power output (e.g., 60 V or less, 600 W or less). In some implementations, the low-voltage supplies 115 can provide low voltage (e.g., 48V DC) and convey signals (which can carry data) to at least one lighting fixture 110 coupled to the power panel directly or via a wiring hub 130. The low-voltage supplies 115 can comprise AC to DC power supplies that convert 120 V AC to low-voltage DC (e.g., 48V DC).

The power panel 105 can include a digital communication input 107 that may use DMX over RS485 or similar to connect to a building lighting control system 150. The communication input 107 may alternatively or additionally support one of many other options including RS232, ethernet, DALI, Wi-Fi or other wireless protocol. The power panel 105 can include one or more transceivers that couple digital data onto the low-voltage power line(s) 207 running to wiring hubs 130. The coupling onto the low-voltage power line(s) 207 can be via an inductor and capacitor network, as described above for the lighting fixtures 110. An example transceiver 240 is the DMX250 available from Yamar Electronics of Tel Aviv, Israel, which couples high frequency signals onto and from the DC powerline. A single transceiver may couple to multiple power lines 207 using multiple inductor-capacitor networks. Alternatively multiple transceivers may be used, each coupling signals to a different low-voltage power line 207.

In some implementations, the power panel 105 includes a controller 109 that may prepare and/or buffer the signal data packets. For example, the controller may buffer data packets of signals received on the digital communication input 107 and also buffer the data for signals to be coupled to the DC power line 207 via the transceiver. In some cases, the controller 109 at the power panel 105 may execute a firmware program that can translate data packets received on the digital communication bus from the control system 150 into a standard protocol to be sent to the lighting fixtures 110 via the power panel's transceiver, low-voltage DC wiring 207, 205, and wiring hub(s) 130.

2I. Power Backup

Some lighting systems 100 can include power backup apparatus 170 and related functionality. According to some implementations, there can be one or more backup AC-to-DC low-voltage power supplies **115*b* in a power panel 105 that do not provide power to the system during normal system operation. The back-up power supply(ies) can be configured to provide power to the system in the event a primary low-voltage power supply (or primary supplies) 115 in the power panel fails (e.g., switched into operation upon detection of failure of another low-voltage power supply 115**). Power would then switch over to the one or more backup supplies.

In some cases, a single back-up AC-to-DC low-voltage power supply **115*b* may serve as the backup supply for multiple primary supplies. Each primary low-voltage power supply 115 can be connected to a corresponding DC output of the power panel 105 via a single relay configured to connect the low-voltage power supply 115 to its DC output when the supply is operational. The relay (e.g., a double-throw relay) may connect the primary low-voltage power supply 115 when voltage delivered by the primary supply is above a defined threshold (e.g., 40 V or higher), and be configured to disconnect the primary supply and connect the backup low-voltage power supply 115*b*** to the DC output when the primary supply is not operational (e.g., drops below 40 V).

The controller 109 within the power panel 105 can protect the backup low-voltage supply **115*b* when it is switched into operation. For example, the controller 109 can monitor voltage and/or power being delivered by the backup low-voltage power supply 115*b* and perform a load shedding function that ensures the backup low-voltage power supply 115*b*** does not exceed its safe operating load current. The load shedding may include one or more of the following actions:

- Reducing the intensity of all lighting fixtures 110 powered by the backup low-voltage power supply **115*b***.
- Turning off lighting fixtures 110 powered by the back-up low-voltage power supply **115*b*. The sequence of turning off may be predefined based on a lighting priority of the fixtures that is stored in memory accessible to the controller of the power panel 105. The priority of lighting can be set by a user or administrator of the system 100. For example, stairways may receive a highest priority followed by hallways, where lighting fixtures 110** having a highest priority are turned off last.

Power backup may be provided additionally or alternatively by one or more battery-backup supplies 170 that are switched into action to power the system if the incoming AC power is lost. The battery backup supply 170 can comprise an external battery system. A similar load monitoring and shedding functionality, as described above, can be employed to ensure that the battery backup supply 170 is not being overloaded or drained at too high a rate when switched into operation.

3. Smart Power

The inventor has recognized and appreciated that the lighting system 100 described above can be enhanced further if it is possible to increase the supply of power on a Class 2 wiring line above 100 W without sacrificing the safety and convenience of Class 2 low-voltage wiring 205. Traditionally a Class 2 wiring installation requires that any power source deliver no more than 100 W at no greater than 60V DC on a single power line. This limitation is applied to ensure that a fault in wiring or the device being powered cannot create a hazard by delivering more than 100 W and no more than 60 V to the fault condition.

A smart power supply 400 (described in connection with FIG. 4) can be employed in the lighting system 100 described above (e.g., in place of a low-voltage power supply 117 at a smart wiring hub 135 and/or in place of a low-voltage supply 115 at the power panel 105) to deliver more than 100 W over a single low-voltage power line 205 while still complying with the intent of the Class 2 limitations (namely, delivering no more than 100 W and no greater than 60 V to a fault condition). A single low-voltage power line can be a 2-wire power line (e.g., speaker wire, or a twisted pair). When implemented at the power panel 105, the smart power supply 400 can reduce the number of power supplies at the power panel 105, the number of corresponding wiring runs from the power panel 105 to the wiring hubs 130, 135, and/or the number of wiring hubs needed to service a room or region of a building. Further, a smart power supply 400 implemented at the power panel 105 may allow Class 2 wiring between the power panel 105 and the wiring hub(s) 130, 135. When implemented at a smart wiring hub 135, the smart power supply 400 can allow more lighting fixtures 110 to be powered over a single low-voltage power line 205 than possible with a low-voltage supply 117. The smart power supply 400 can be implemented by adding sensor circuitry and additional controller functionality at a wiring hub.

Figure 4:
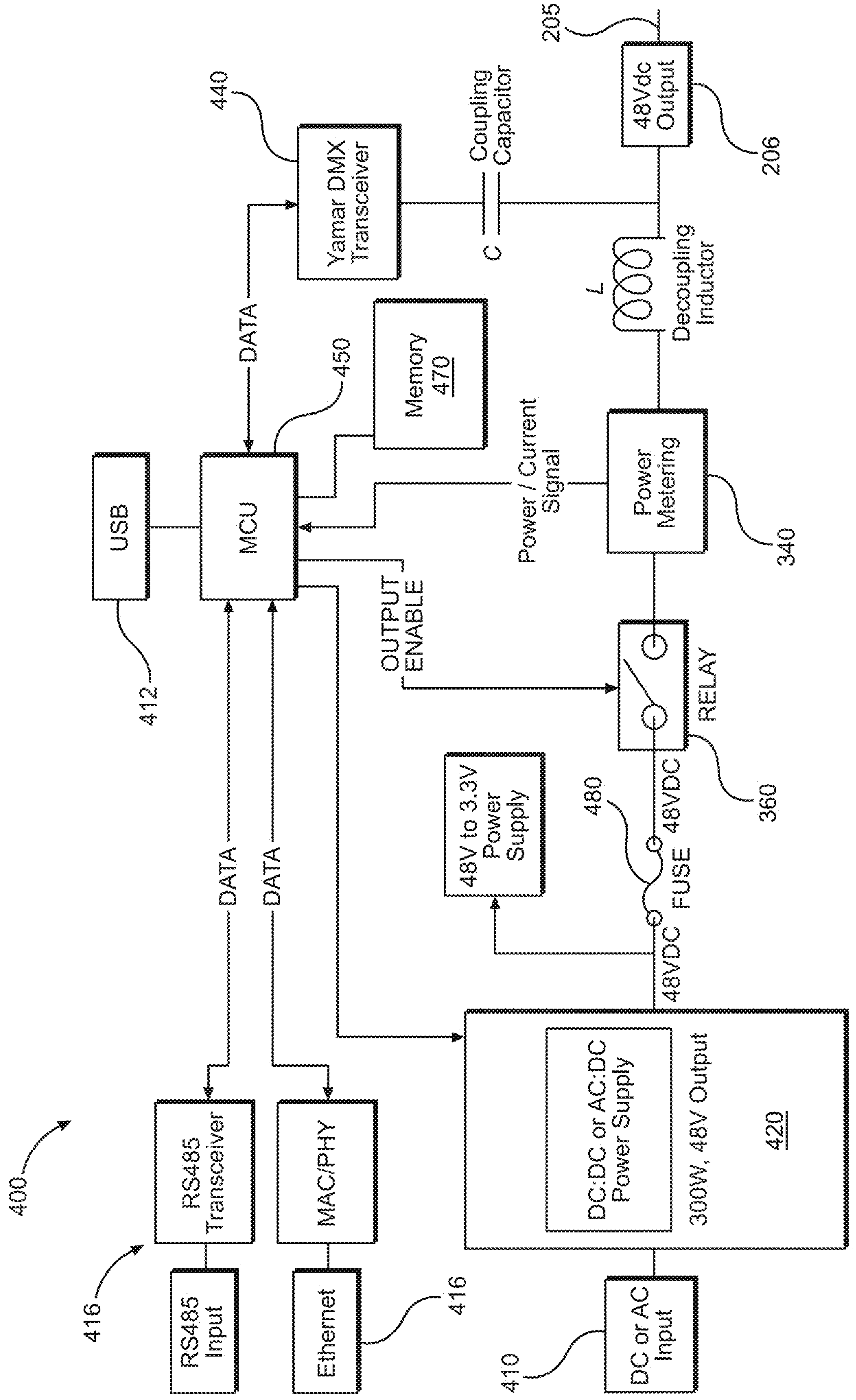
FIG. 4 depicts an example of circuitry for a smart power supply that can be used in the lighting system of FIG. 1.

FIG. 4 depicts an example of a smart power supply 400. The supply includes power metering circuitry 340 to sense an amount of power delivered by the supply 400 to an output terminal 206 and low-voltage power line 205. One example of power metering circuitry 340 is the ACS37800 power monitoring chip available from Allegro Microsystems of Manchester, New Hampshire. The smart power supply further includes a controller 450 communicatively coupled to the power metering circuitry 340 and communicatively coupled to a transceiver 440. The controller 450 can be a device identical to the controller 250 described above in connection with FIG. 2 though programmed differently or may be a different controller. The transceiver 440 can be a device identical to the transceiver 240 described above in connection with FIG. 2 or may be a different transceiver. The controller 450 can monitor the amount of power delivered by the smart power supply 400 to the low-voltage power line 205 and output terminal 206, as well as receive reports over the low-voltage power line 205, via the transceiver 440, of power consumption from devices (such as wiring hubs 130, 135, lighting fixtures 110) connected to and supplied power by the smart power supply 400 over the power line 205. The smart power supply 400 can further include a switch 360 (e.g., a relay or MOSFET) to disable power delivery when the controller 450 detects potentially excessive power consumption on the low-voltage power line 205.

Commands to operate lighting fixtures 110 connected to the smart power supply 400 can be relayed or sent via the transceiver 440 over the low-voltage power line 205 that carries power to operate the fixtures from the smart power supply 400 to the fixtures. The controller 450 may also communicate to an external device, via transceiver 440, over wiring connected to the DC or AC input 410 in some cases. Additional communications with the controller 450 can be made in several ways (e.g., via a USB port 412, RS 485 port and transceiver 414, or ethernet port 416). The controller 450 can also communicate with and control an amount of power delivered by a power source 420 (e.g., a DC/DC or AC/DC power converter so as to suspend or limit the power delivered to the output terminal 206.

3A. Monitoring Power and/or Current Delivered

In some implementations, the smart power supply 400 can be designed to deliver, under certain conditions, up to 300 W of power or more at a selected AC or DC voltage (e.g., 12 V, 24 V, 48 V, 60 V, or another voltage value) over a single low-voltage power line 205 that could comply with Class 2 safety measures (such as delivering no more than 100 W and no more than 60 V to a fault condition). In some implementations, the power delivered under certain conditions can be up to 500 W or up to 750 W. To operate with higher power delivery, the smart power supply 400 monitors the amount of power being delivered to its output low-voltage power line 205 and also monitors consumption of power reported by each device connected to that line to evaluate whether there is any discrepancy between the delivered power and the reported power consumed by the devices on the line. Any discrepancy between delivered power and power consumed by the devices is identified as a fault condition which shuts down or limits the power output by the smart power supply 400 to 100 W.

In operation and according to some implementations, the smart power supply 400 monitors the current or power being delivered using measurement methods such as a shunt resistor, hall effect sensor, or other method with power metering circuitry 340. The connected loads (lighting fixtures 110 in this example) also repeatedly measure their average input current or power over a period of time (e.g., a time interval in a range from 0.5 millisecond to 1 second). The loads can report their average power consumption to the smart power supply 400 at a similar rate. The smart power supply 400 compares the current or power delivered to the low-voltage power line 205 with the summed total of current or power consumed by each load. The comparison can be done at a same rate or slower rate than the rate at which reports are received from the loads. Under normal operating conditions these values should match to within an acceptable, predetermined amount (e.g., having a differences less than 1%, 2%, 3%, 5%, 7.5%, 10% or some other value). In the event the current or power provided to the power line 205 is greater than the consumed current or power reported by the devices on the line, a fault or rogue device drawing excessive or unaccounted for power may be assumed. The smart power supply can immediately shutdown or reduce its maximum power output to 100 W to protect the system and/or avoid a potentially dangerous fault condition.

In some cases, each connected load on the low-voltage power line 205 can communicate to the smart power supply 400 a maximum current and/or power that the load is rated to draw, which can also be checked during operation by the smart power supply 400. Power or current drawn in excess of the rating can be detected by the controller 450, which can then shut down or limit output power from the smart power supply 400.

A lighting fixture 110 can be configured to determine and/or report its power or current consumption using other methods. According to one approach, the lighting fixture 110 can report an estimated power consumption to the controller 450 without actually measuring current or power consumed. For example, the lighting fixture 110 can use and/or include a look-up table (LUT) or a conversion algorithm that maps an intensity level setting (e.g., a brightness level or DMX level at which the fixture is set, or a photonically-measured light output) to power or current consumed by the lighting fixture. The LUT can be determined at manufacture time of the lighting fixture 110 or during installation and commissioning of a lighting system that includes the lighting fixture 110. An estimated power consumption that is based on a brightness level setting can avoid adding current or power-sensing electronics to the lighting fixture. Further, the LUT can be provided to the controller 450 when installing and commissioning the lighting system 100 so that the lighting fixture(s) 110 need not report power consumption periodically in real time.

In some cases, the smart power supply 400 is configured to estimate power or current consumed by each device connected on a single low-voltage power line 205 to the smart power supply. For example, the smart power supply 400 can use, for each connected device, an LUT that correlates the brightness level or DMX level at which the lighting fixture 110 is set to the current and/or power consumed by the lighting fixture. The smart power supply 400 can estimate power consumed by each connected fixture 110 based upon a recent and current brightness setting command and/or color command that was transmitted by the smart power supply 400 to each connected fixture 110 and at which each lighting fixture currently operates. Estimating power by the smart power supply 400 in this manner can avoid sensing current or power consumption at the device or lighting fixture 110 and avoid communications relating to reporting current or power consumption by the connected device or lighting fixture 110. The smart power supply 400 can sum all estimated power consumption values and compare the sum against power delivered as measured by the smart power supply 400.

When the smart power supply 400 estimates power or current consumed using a look-up table for a connected lighting fixture 110, there are at least three ways in which the LUT can be obtained. A first way is for the LUT to be stored into memory 470 accessible by the controller 450 of the smart power supply 400. There can be many such LUTs stored into the memory 470, where each LUT is associated with a particular make and mode of a lighting fixture 110. During or after a registration or handshaking process (described below), the smart power supply 400 can determine which LUT is associated with each lighting fixture 110 identified in the handshake or registration process, and then use the LUT(s) during operation of the lighting fixture(s) to estimate each fixture's power or current consumed based brightness and/or color settings sent most recently to each lighting fixture 110. In another approach, the LUT(s) can be retrieved from the connected lighting fixture(s) 110 by the smart power supply 400 during or after the handshake or registration process. Similarly, the smart power supply 400 can determine power consumption by other devices (e.g., devices comprising motors, fans, speakers) for which LUTs identifying power consumption for device settings are available.

In yet another approach, the smart power supply 400 can learn the power and/or current consumption behavior, as a function of brightness setting and/or color setting, during operation of the lighting fixture(s) 110, construct an LUT based on the learned behavior for each connected lighting fixture, and then use the LUT(s) subsequently when monitoring power delivery to the lighting fixture(s). The process of learning power and/or current consumption can be based on sensor measurements made of consumed power and/or current by each lighting fixture 110 and reported to the controller 450, as described above. After learning a power and/or current consumption behavior for a lighting fixture 110, the smart power supply 400 can ignore or signal termination of communications from the connected lighting fixture 110 for purposes of reporting the fixture's power and/or current consumption, thereby increasing the speed at which the smart power supply 400 can monitor current and/or power delivered to the low-voltage power line 205 and the speed at which corrective action can be taken (e.g., shut down or power limiting).

In some implementations, a smart power supply 400 is configured to provide more than 100 W to a low-voltage power line 205 only when all devices on that line correctly register or properly handshake with the smart power supply 400 to indicate that they are compatible with operating under an excess power condition (more than 100 W delivered to the line). Such a registration or handshaking process can ensure that power can be correctly monitored and accounted for and safely delivered to all loads on the line at power levels exceeding 100 W. If a device connects to the line that cannot register or handshake properly (and therefore cannot report current or power consumption nor provide information about current or power consumption), then the smart power supply 400 can be configured to deliver only up to 100 W of power to the power line 205 while the non-compliant device is connected to the line.

The registration or handshake process can be performed during installation or anytime thereafter and may comprise receiving information from each device connected to a low-voltage power line 205 in response to a query from the smart power supply 400. The query can be issued over the power line 205. Compliant devices can respond with appropriate information (e.g., identifying information, an authorization code, an LUT, or some combination thereof). A non-compliant device may be silent and not respond. In such a case, the smart power supply 400 will immediately detect during operation a discrepancy in power consumed by the connected devices and power delivered to the power line 205, causing the smart power supply 400 to limit power delivered to the power line 205 to 100 W.

Additional protection may also be included in the connected devices (e.g., in each lighting fixture 110) to limit the potential power the fixture may draw. The protection can include: a fusing element (e.g., a fuse that may open if current or power exceeds a threshold level), a resettable fuse that may increase in resistance based on temperature, an active fuse that monitors the current and limits or disconnects the load should current exceed a threshold, or some combination of these elements.

Additional protection (e.g., fuse 480) may also be included in the smart power supply 400 to limit the peak current and/or power that may be delivered under a short circuit condition. The additional protection circuitry may be designed to engage in a shorter period of time than the periodic interval used to compare the monitored delivered power and/or current with the reported or calculated consumed power and/or current.

By accounting for delivered current and/or power (e.g., comparing consumed current against delivered current), any fault on the low-voltage wiring 205 (such as excess monitored power delivered over reported power consumed, which could be due to onset of a short circuit or partial short circuit) can be detected and protected against before the fault can create a hazard.

For some applications, a limit of 300 W (or some other value such as 500 W or 750 W) can be imposed by the smart power supply 400 based on other factors such as the gauge and rating of the low-voltage wiring 205 being used and/or the peak current that may flow under a short circuit condition. A 300 W limit on power delivered to a low-voltage power line 205 would permit up to thirty (30) lighting fixtures 110, each consuming 10 W, to be wired on each single low-voltage power line 205, simplifying the installation and lowering the wiring and component cost. Increasing the number of lighting fixtures 110 on a power line 205 could reduce the number of wiring hubs 130 or even eliminate the wiring hubs in some installations, allowing lighting fixtures 110 to be wired back to the power panel 105 which could contain the smart power supplies 400. In some implementations, there can be a mix of smart power supplies 400 at smart wiring hubs 135 and at the power panel 105.

3B. Power Blanking

In another approach, the smart power supply 400 signals all devices on the power line 205 to briefly stop drawing power. The suspension can be for a time not appreciably noticeable to the human eye (e.g., 10 milliseconds or less). During the power suspension or blanking time, the smart power supply 400 checks to see if any power is being drawn from the power line 205. If power is being drawn, the smart power supply determines that a non-compliant device is connected to the power line 205 and shuts down or limits its output to 100 W. This can be one way for the smart power supply 400 to detect non-compliant devices connected to the power line 205.

In further detail, the smart power supply 400 can monitor the current and/or power being delivered to the low-voltage wiring 205 using methods described earlier. The smart power supply 400 can also transmits a signal on the low-voltage wiring 205 for all connected devices to briefly cease drawing power. The command to cease power draw can be sent once at start-up or turn-on of the devices and may or may not be sent periodically (e.g., every few seconds). The length of the blanking time can be in a range from 0.1 ms to 100 ms, though shorter durations or longer durations may be possible. During the blanking time, each load may or may not switch over to a reserve power source, such as hold-up capacitors or a battery within the fixture, which can provide sufficient energy for the fixtures to remain operational and output some light, so that the blanking time is not noticed. In some implementations, the periodicity of blanking command sent to the devices and the duration of blanking is short enough that reserve power sources are not needed in the lighting fixtures. In some cases, the repeated power suspensions are merely perceived as an overall change in average intensity of light emitted from the lighting fixtures 110.

During the blanking time, the smart power supply 400 monitors for any current or power being drawn from the supply, which should not occur if all devices on the low-voltage wiring 205 have properly suspended their current draw. Under normal operating conditions, no current should be measured. Any faults and/or unregistered or non-compliant devices on the line will continue to draw power resulting in a detectable current by the smart power supply 400. If current above a threshold level is measured, the smart power supply 400 can deduce a fault condition and/or connection of an unregistered or non-compliant device. The smart power supply 400 can immediately shutdown power delivery entirely or limit power delivered to 100 W to protect the system.

The blanking command signal sent by the smart power supply 400 to cause the devices to suspend power draw can take different forms. In one implementation, the smart power supply can briefly stop power delivery (e.g., for a time interval having a value in a range from 0.5 ms to 10 ms). Compliant devices connected to the low-voltage wiring can be configured to detect the drop-out in power and to respond by suspending power consumption briefly (as described above), which can follow shortly after the smart power supply's interruption of power delivery. For example, the connected devices can be configured to initiate suspension of power consumption a predetermined time after the power interruption (e.g., 10 ms, 20 ms, 50 ms, 100 ms, 200 ms, 500 ms, or some other time span following the end or beginning of the power supply's interruption of power deliver). In some cases, the connected devices can be configured to initiate suspension of power in response to two or more power interruptions issued by the smart power supply 400. For example, a first power interruption can notify the connected devices to prepare for a temporary suspension of power consumption and a second power interruption can initiate and synchronize suspension of power consumption in the connected devices.

Another approach to signaling is for the smart power supply 400 to induce a brief voltage pulse or sequence of pulses on the low-voltage wiring 205 that ride(s) on top of the average voltage on the line. The voltage pulse(s) can be coupled onto a low-voltage power line 205 using an inductor L and capacitor C, as depicted in FIG. 4 for example. The amplitude of the signaling pulse(s) may be from 0.2 V to 10 V and the full-width half-maximum pulse duration may be from 0.1 ms to 10 ms. The connected devices can be configured to recognize the pulse(s) and respond by suspending power consumption.

Yet another approach is to signal the devices on the low-voltage wiring 205 using one or more digital data packets encoding a blanking command. The data packet(s) can be transmitted by the transceiver 440 in the smart power supply 400, that may be used for communication over the low-voltage wiring 205 described earlier, and received by a transceiver 240 in a lighting fixture 110, for example. The lighting fixture's controller 250 can decode the data packet (s) to detect the blanking command and control the lighting fixture 110 accordingly.

3C. Avoiding Signal Collisions

To avoid signal collisions between two or more lighting fixtures 110 when transmitting their power or current consumption to a smart power supply 400, a polling protocol can be employed. The smart power supply 400 may query each fixture sequentially by transmitting a unique address when signaling a lighting fixture 110 to respond. The lighting fixture 110 with matching address would respond within a given time period with its consumed power and/or current. The unique address may be assigned to each lighting fixture 110 during the initial setup or commissioning process (e.g., during installation, or when powering up the lighting fixtures 110 on a low-voltage power line 205 from an off state). The address may be assigned manually or by an automated method to ensure all devices connected to a smart power supply 400 on a single low-voltage power line 205 have a unique address.

In another approach, signal collisions can be avoided by employing a time division multiplexing approach. Each lighting fixture 110 can be assigned a different timeslot in which to communicate. In some cases, the smart power supply 400 may repeatedly initiate the power reporting request by signaling the lighting fixtures 110 on a low-voltage power line 205 to report consumed power and/or current as described above. Upon receipt of the power reporting request, all lighting fixtures 110 connected to the power line 205 may initialize a timer and execute a clock function with an onboard clock. When the on-board clock reaches the beginning of the lighting fixture's assigned time slot, the lighting fixture 110 can begin transmitting its power consumption information to the smart power supply 400. The lighting fixture's timeslot can be assigned based on the unique address of the fixture, response order in reply to a request for identification, randomly, or according to some other criterion.

Other signaling protocols can be used. In some implementations, query and response signaling between the smart power supply 400 and devices connected on a low-voltage power line 205 can follow query and respond protocols used by radio-frequency identification (RFID) tags and tag readers.

4. Outdoor Lighting Systems

Figure 5:
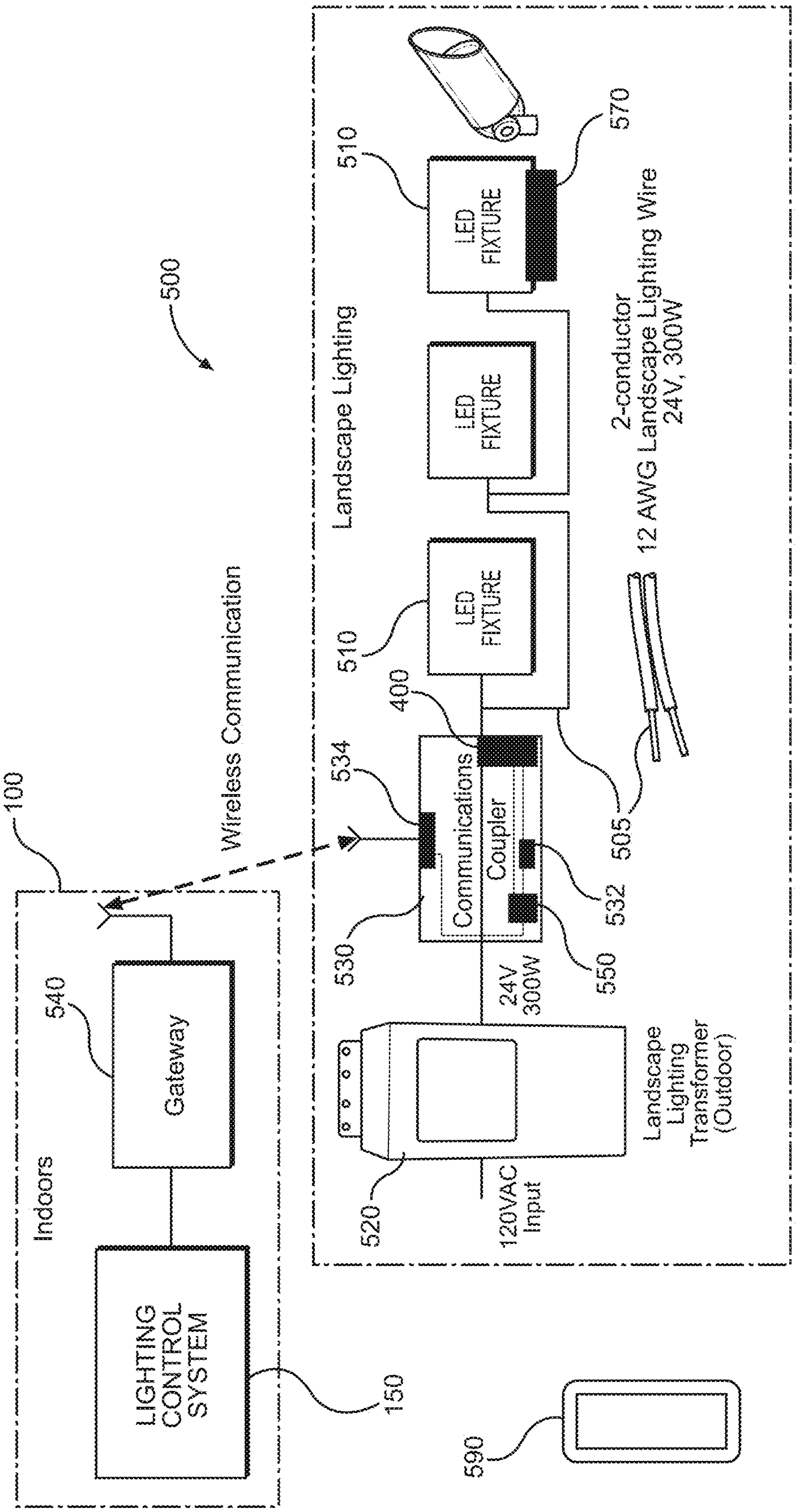
FIG. 5 is an example of an outdoor lighting system.

Components of the lighting system 100 described above can be used with outdoor lighting systems 500 which can include landscape lighting, as depicted in FIG. 5. Landscape lighting often employs low-voltage wiring using two-conductor landscape wiring 505 to power low-voltage lighting fixtures 510. Fixtures are typically powered by a 12 V or 24 V low-voltage transformer 520. Frequently, all lighting fixtures 510 connected to the output of a transformer 520 are controlled as a single circuit.

FIG. 5 depicts an implementation of an outdoor lighting system 500 that may be communicatively coupled to the lighting system 100 of FIG. 1. The outdoor lighting system 500 can include a communication coupler 530 to couple communications from and to the indoor lighting system 100. The communication coupler can connect between the transformer 520 and lighting fixtures 510.

The outdoor lighting fixtures 510 may be in different forms to provide for various applications including spotlights, pathway lights, flood lights, tape lights, etc. A lighting fixture 510 can include any combination of the components described above for the lighting fixtures 110 of the lighting system 100, though the trim and housing can differ for outdoor lighting fixtures. The lighting fixtures 510 can include different sensors, such as a soil moisture sensor and ambient light sensor.

The transformer 520 converts 120 V AC to 12 V DC or 24 V DC. Low-voltage landscape wiring 505 connects between the transformer 520, communications coupler 530 and the light fixtures 510. Multiple light fixtures 510 can be connected in parallel limited by the available power from the transformer. A typical transformer 520 may be able to provide up to 300 watts of power and a landscape lighting fixture may consume 10 W, allowing up to 30 outdoor lighting fixtures 510 to be connected to a single transformer 520, for example.

The communication coupler 530 can couple to the same low-voltage wiring 505 that is used to provide power to the outdoor lighting fixtures 510. The communication coupler 530 can include a power supply to convert the incoming voltage, say 24 V to a lower voltage for internal circuitry, typically 3.3V. The communication coupler 530 can also include a power supply 117 or smart power supply 400 as described above. The communication coupler 530 can also include a first transceiver 532 to transmit and receive signals over the outdoor low-voltage wiring 505 to and from connected outdoor lighting fixtures 510. The first transceiver 532 may couple data to the low-voltage wiring using an inductor L and capacitor C network, like that shown in FIG. 4 for the smart power supply's transceiver 440. The first transceiver 532 can be a same model of transceiver used by the smart power supply 400 or a different model.

The communication coupler 530 can further include a second transceiver 534 to receive and transmit signals from and to an indoor lighting system 100. The second transceiver 534 may be hardwired to the lighting system 100 (e.g., using RS485 wiring) or may use a wireless link to communicatively couple to the indoor lighting system 100, eliminating wiring back to the building's lighting system 100. For wireless communications, the second transceiver 534 communicates to a gateway 540 that is communicatively coupled to the indoor lighting system 100 and/or its control system 150. Numerous wireless protocols exist including Zigbee, LoRa, Bluetooth Low Energy/BlueTooth Mesh, wireless DMX and other proprietary protocols. The indoor lighting system 100 can be installed in a residential, commercial, industrial, academic, or other building.

A wireless connection between an indoor lighting system 100 and outdoor lighting system 500 provides numerous benefits including:

- Simplifying installation by eliminating the need to run low-voltage signal wiring from the communications coupler 530, typically located outdoors, back to the building's lighting system 100 and/or control system 150, the latter of which is typically located within the home.
- Increasing reliability by eliminating potential surge voltages and currents that may be induced on long wire length by nearby lightning strikes. Such surges can induce sufficient energy to cause damage to any equipment connected.

The communication coupler 530 can also include a controller 550 to translate communication between the two transceiver circuits. The controller 550 may execute functionality including (1) buffering signal data packets between the two networks that may have different data transmission rates and/or (2) implementing mechanisms to ensure communication reliability such as packet validation, retry mechanisms, channel hopping, address mapping between the networks etc. The controller 550 may or may not be a same model as that used in the lighting fixture 110.

In some installations, it may be advantageous to locate the communication coupler 530 remotely from the transformer 520. The communication coupler 530 may be located close to a lighting fixture 510 that is wired to the transformer 520. In some cases, the communication coupler 530 can be located in an interior space such as a shed, garage, or even the building housing the system controller 150. The communication coupler 530 can physically connect to the low-voltage wiring 505 running between the transformer 520 and lighting fixtures 510 and can utilize a wireless connection to the building control system 150, in some implementations.

In some cases, the communication coupler 530 can be embedded within one or more lighting fixtures 510 or other devices wired to the transformer 520. By embedding it within a lighting fixture, no separately-packaged communication coupler need be installed, thus simplifying the installation and wiring of the outdoor lighting system 500. In some implementations, a lighting fixture 510 embedded with a communication coupler 530 can act as a master fixture, relaying messages between the building control system 150 and the outdoor lighting fixtures 510 physically connected to the master fixture via the low-voltage wiring 505.

It is also possible for all fixtures to be embedded with a communication coupler 530. One or all of the embedded communication couplers 530 can include wireless transceiver functionality for connecting to the building control system 150. In this scenario, the communication between building control system 150 and outdoor lighting fixtures 510 may use a direct wireless connection from the system gateway 540 to the lighting fixtures 510 and not rely on any communication over the low-voltage wiring 505.

In a system using wireless communication, reliability of communications is desirable. The wireless network can employ several methods to ensure communications reliability. These methods can include: (1) increasing the transceivers 534 transmit power and receiver sensitivity so that signals can be received under harshest environmental conditions, (2) adjusting/increasing the antenna's efficiency, gain, and radiation pattern to improve signal reception, (3) implementing a mesh network to extend the range of the system and not rely on point-to-point communication, and (4) implementing end-to-end retries to ensure all devices receive the transmission.

For some installations it may be beneficial to package the communication coupler 530 and transformer 520 into a single packaged device. The combined device has the benefits of eliminating the need to purchase and install an additional device. Packaging the communication coupler 530 with the transformer 520 may have other benefits that include a lower cost system which can be built using conventional landscaping lighting fixtures. The conventional lighting fixtures may not contain communications capability but could be intensity-controlled by adjusting applied power from the transformer 520. In this scenario the combined communications coupler 530 and transformer 520 can regulate the voltage and/or power being applied to the low-voltage power line 505, thus controlling the brightness of the attached fixtures. Even with the voltage reduced to zero to turn off the lights, the communications coupler 530 remains powered and able to receive commands from the control system 150.

The combined communications coupler 530 and transformer 520 can also monitor and report the power being consumed by the connected fixtures as well as monitor and report any possible faults that may be detectable such as a short circuit in the output. The combined communications coupler 530 and transformer 520 may also take advantage of the AC wiring connection to the input of the transformer 520 to communicate to the building control system 150. A power line transceiver (like that used on the low-voltage wiring 505) may be included to couple signals onto and from the AC wiring connecting the transformer 520 to AC wiring in the building. A power line coupler located within the building may be used to connect the building control system 150 to the AC power line facilitating communication between the building control system 150 and the communication coupler 530 without a wireless transceiver or a dedicated low-voltage communications wire being run outdoors.

There are additional aspects of outdoor lighting that may be better controlled with the lighting system 500 described above. Several potential outdoor lighting applications are described below.

Landscape lighting scenes are typically restricted to intensity control. The intensity control also has limited granularity of control, affecting all lights wired together as a single circuit. The system described above provides the ability to communicate to each fixture independently allowing intensity scenes to be fine-tuned (both in terms of intensity and color temperature) to highlight the various landscape features. For example, control signals can be sent to each outdoor lighting fixture 510 to adjust intensity and/or color temperature independently of other lighting fixtures 510. At different times, the different landscape elements can be highlighted differently, for example the spotlights aimed at trees may remain at full brightness throughout the night, while the pathway lights may be dimmed to different levels based on the time of day or the presence of motion. A conventional system would require individual zones of control to be defined and wired to independent transformers and/or controllers for independent lighting control. The outdoor lighting system 500 can provide flexible zoning and independent control of lighting fixtures 510 from a single transformer and on a single low-voltage power line 505.

Individual control of lighting fixtures 110, 510 over a single low-voltage power line 205 can be achieved by including lighting fixture identifications with each lighting command sent over the power line. Each lighting fixture may have or be assigned an identification (ID) which can be unique for all fixtures in an installation or may be shared for fixtures that are to be controlled in a same way. A lighting fixture 110, 510 can act on a received command having an ID value that matches the ID of the lighting fixture.

Lighting color control and/or color temperature control can be included when illuminating an outdoor scene. Conventional outdoor lighting control typically does not provide additional channels to affect the color temperature or color of the illumination. Outdoor scenes may be illuminated in different color hues based on season, holiday events, or homeowner preference to highlight the landscape and/or building features using different color temperature or color. In some cases, color can be selected based on the flowers in bloom in the illuminated area.

Directionality of lighting may be controlled by the lighting system 500 to better highlight landscape features. Conventional lighting fixtures are aimed during initial installation. The fixtures may require subsequent aiming periodically based on the changing landscape features (e.g., trees and bushes growing or being pruned, flowers blooming, etc.) Conventional systems require physical interaction with the fixture to aim and focus and require changing optics or diffuser to adjust the beam angle. This level of interaction is typically not feasible especially at nighttime when the effects of quality lighting are visible.

An indoor lighting fixture 110 and an outdoor lighting fixture 510 can include one or more embedded servo motors 570 to control pointing and/or focusing of light emitted from the fixture. The servo motor(s) 570 can be included with the fixture and driven with pulse drivers, for example. The pulse drivers can be in communication with the fixture's controller 250, 550 which can control the number of pulses applied to a servo motor and direction of motor rotation. In some cases, rotation and elevation angle of light emission from the fixture can be controlled in response to receiving commands over the low-voltage wiring 205, 505 or in response to receiving commands wirelessly. Servo motors 570 may also be implemented to control diffusion and/or pattern of emitted light (e.g., changing a location of an optical element in the lighting fixture with respect to the fixture's LED light source 210).

Implementations of the outdoor lighting system 500 can allow a user, installer, landscape designer, or lighting designer to walk the grounds in the evening hours and use a wireless device 590 (e.g., a laptop, tablet, and/or smartphone) to configure each fixture (intensity, color, color temperature, directionality, beam focus, etc.) and reconfigure illumination without physically accessing each lighting fixture 510. The wireless device 590 can communicate to outdoor lighting fixtures 510 via the second transceiver 534, for example, and/or may also communicate with the building control system 150 over a wireless link (e.g., Wi-Fi, Bluetooth®, or a cellular connection). In some cases, the wireless device 590 can communicate directly to a fixtures 510 in close proximity using a Bluetooth®, NFC, or Wi-Fi connection between the wireless device and the fixture.

An outdoor lighting system 500 and topology as described above has other potential uses beyond lighting. One such use includes operation of speakers for outdoor audio. Outdoor speakers can be installed and connected to the same low-voltage wiring as the landscaping lighting fixtures 510. The speakers can be active speakers that are powered via the 24 V DC supply from the transformer 520. The audio stream may be coupled to the low-voltage wiring 505 by the communications coupler 530 and extracted by the active speaker, amplified, and output. Alternatively, the active speakers can receive the audio stream wirelessly. Connection to speakers via Bluetooth® is a common use case allowing homeowners to stream music from their phone to a nearby outdoor speakers.

Security systems 190 (shown in FIG. 1) may benefit from interfacing with the outdoor lighting system 500 and/or indoor lighting systems 100. The lighting fixtures 110, 510 can include motion detectors and/or cameras powered from the low-voltage wiring 205, 505. Data from a motion detector and/or camera may be transmitted back to the building control system 150 and an action taken such as turning on the outdoor lighting and/or indoor lighting. If cameras are embedded within the lighting system, the video feed may be fed back to a centralized system for recording or for real-time monitoring. Communication of video may be wireless using Wi-Fi or via the low-voltage wiring 205, 505 at a lower image resolution.

5. Kits

The above described wiring hubs 130, 135 and/or power supplies 115, 117, 400 can be implemented in kits with LED lighting fixtures 110. For example, a wiring hub 130 and/or smart wiring hub can be included in a kit with one or more LED lighting fixtures 110. The lighting fixtures may or may not include all the components of the lighting fixture 110 exemplified in FIG. 2. As an example, a smart wiring hub 135 (which includes at least one smart power supply 400) can be included in a kit with one or more lighting fixtures 110 that may or may not include at least one of a transceiver 240, a controller 250, or a near field communication chip 270. If the lighting fixture 110 does not include a transceiver and controller, the smart power supply 400 in the kit may be configured to access stored information about the lighting fixture (e.g., information identifying power consumption by the lighting fixture as a function of intensity and/or color setting of the lighting fixture). In some cases, the information is stored in an LUT in memory 470 accessible by a controller of the smart power supply 400. As another example, a wiring hub 130 that does not have smart power metering can be provided in a kit with one or more LED lighting fixtures 110, which may or may not have all the components of the lighting fixture 110 exemplified in FIG. 2.

The above-described lighting systems and components can be implemented in different configurations, some of which are listed below.

(1) A power supply (400) comprising: a power source (420) to output electrical current; an output terminal (206) coupled to the power source to provide the electrical current to a device (110, 510) when the device is coupled to the output terminal to receive power from the power source; power metering circuitry (340) to sense at least one of the electrical current or first electrical power delivered to the output terminal; and a controller (450) communicatively coupled to the power metering circuitry and the power source, wherein the controller is configured to: determine a first amount that is indicative of the first electrical power delivered from the power source to the output terminal to power at least the device when the device is operating and coupled to the output terminal; compare the first amount to a second amount, wherein the second amount is indicative of second electrical power consumed by at least the device when the device is operating and coupled to the output terminal; and if the first amount differs from the second amount by more than a predetermined threshold amount, limit the first electrical power to a predetermined power level.

(2) The power supply of configuration (1), wherein: the predetermined power level is no larger than 100 watts and a voltage provided to the output terminal by the power supply is no greater than 60 volts; and the controller is further configured to: control the power source to deliver from 100 watts to 500 watts of electrical power to the output terminal if the first amount does not differ from the second amount by more than the predetermined threshold amount.

(3) The power supply of configuration (1) or (2), further comprising a transceiver (440) communicatively coupled to the output terminal to transmit signals via the output terminal and receive signals via the output terminal, wherein the controller is further configured to: send first signals to the device via the transceiver to control the device, when the device is coupled to the output terminal and operating; receive a second signal from the device via the transceiver, the second signal indicative of third electrical power consumed by the device; and determine the second amount based, at least in part, on the second signal.

(4) The power supply of configuration (3), wherein the device is an LED lighting fixture and the first signals control at least one of intensity of light output from the LED lighting fixture or color temperature of the light output from the LED lighting fixture.

(5) The power supply of configuration (4) in combination with the LED lighting fixture, wherein the controller is a first controller, the transceiver is a first transceiver, and the lighting fixture comprises: a second transceiver (240) coupled to a low-voltage power line; and a second controller (250) communicatively coupled to the second transceiver, the second controller configured to: receive the first signals via the second transceiver; and control at least one of the intensity of the light output from the LED lighting fixture or the color temperature of the light output from the LED lighting fixture based on information included in the first signals.

(6) The power supply of configuration (5), wherein the second controller is further configured to: determine at least one of current or power consumed by the LED lighting fixture; and transmit to the power supply the second signal.

(7) The power supply of any one of configurations (3) through (6), wherein the device is a first device and the controller is further configured to: send third signals to a second device via the transceiver to control the second device, when the second device is coupled to the output terminal and operating; receive a fourth signal from the second device via the transceiver, the fourth signal indicative of fourth electrical power consumed by the second device; and determine the second amount based, at least in part, on the second signal and the fourth signal.

(8) The power supply of any one of configurations (3) through (7), wherein the controller is further configured to determine the second amount based, at least in part, on information stored in memory and accessible to the controller, the information identifying power consumption of the device as a function of settings for the device.

(9) The power supply of configuration (8), wherein the information is stored in a look-up table.

(10) The power supply of any one of configurations (3) through (9), wherein the controller is further configured to: initiate a temporary suspension of the first electrical power delivered to the output terminal; determine from a time interval following the suspension whether power is being drawn from the output terminal during the time interval; and if power is being drawn from the output terminal during the time interval, limit the first electrical power to the predetermined power level.

(11) The power supply of any one of configurations (3) through (10), further comprising a transceiver (440) communicatively coupled to the output terminal to transmit signals via the output terminal and receive signals via the output terminal, wherein the controller is further configured to: issue a query command via the output terminal; receive in response to the query command, via the output terminal, identification information for the device; and if no or non-compliant identification information for the device is received, limit the first electrical power to the predetermined power level.

(12) The power supply of any one of configurations (3) through (11), further comprising: a power converter (420) configured to receive input electrical power of a first form and produce output electrical power of a second form, the second form differing from the first form in at least one of voltage or maximum power provided on a single power line.

(13) The power supply of configuration (12) included in a wiring hub (135), the wiring hub comprising: an input (305) to receive the input electrical power of the first form classified according to United States National Electrical Code Class 1 criterion; and the power supply of claim 1 arranged to receive the input electrical power and provide at its output port output electrical power of a second form classified according to United States National Electrical Code Class 2 criterion.

(14) A method of operating a power supply (400), the method comprising: outputting electrical current with a power source (420); delivering, to an output terminal (206) coupled to the power source, the electrical current to provide first electrical power to a device (110, 510) coupled to the output terminal; sensing, with power metering circuitry (340), at least one of the electrical current or the first electrical power delivered to the output terminal; determining, with a controller (450) communicatively coupled to the power metering circuitry, a first amount that is indicative of the first electrical power delivered to the output terminal to power at least the device; comparing the first amount to a second amount, wherein the second amount is indicative of second electrical power consumed by at least the device; and if the first amount differs from the second amount by more than a predetermined threshold amount, limiting the first electrical power to a predetermined power level.

(15) The method of (14), wherein the predetermined power level is no larger than 100 watts and a voltage provided to the output terminal by the power supply is no greater than 60 volts, the method further comprising: controlling, by the controller, the power source to deliver from 100 watts to 500 watts of electrical power to the output terminal if the first amount does not differ from the second amount by more than the predetermined threshold amount.

(16) The method of (14) or (15), further comprising: transmitting, with a transceiver that is communicatively coupled to the controller, first signals to the device to control the device; receiving, via the transceiver, a second signal from the device that is indicative of third electrical power consumed by the device; and determining, by the controller, the second amount based, at least in part, on the second signal.

(17) The method of (16), wherein the device is an LED lighting fixture and the first signals control at least one of intensity of light output from the LED lighting fixture or color temperature of the light output from the LED lighting fixture.

(18) The method of (17), wherein the controller is a first controller, the transceiver is a first transceiver, and the method further comprises: receiving the first signals via a second transceiver at the LED lighting fixture; and controlling, with a second controller at the LED lighting fixture, at least one of the intensity of the light output from the LED lighting fixture or the color temperature of the light output from the LED lighting fixture based on information included in the first signals.

(19) The method of (18), further comprising: determining, with the second controller, at least one of current or power consumed by the LED lighting fixture; and transmitting, by the second transceiver, the second signal to the power supply.

(20) The method of any one of (16) through (19), wherein the device is a first device, the method further comprising: sending, via the transceiver, third signals to a second device to control the second device; receiving, via the transceiver, a fourth signal from the second device, the fourth signal indicative of fourth electrical power consumed by the second device; and determining, by the controller, the second amount based, at least in part, on the second signal and the fourth signal.

(21) The method of any one of (14) through (21), further comprising: determining, by the controller, the second amount based, at least in part, on information stored in memory and accessible to the controller, the information identifying power consumption of the device as a function of settings for the device.

(22) The method of (21), wherein the determining comprises accessing a look-up table.

(23) A lighting fixture comprising: an input terminal (304) to receive power from a low-voltage power supply; an LED light source (210) to emit light; an LED driver (230, 322) to provide current to the LED light source; a controller (250) to control an amount of current provided by the LED driver to the LED light source; a transceiver (240) communicatively coupled to the controller and to the input terminal; and power metering circuitry (340) to measure a first amount indicative of electrical power consumed by at least the LED light source during operation of the lighting fixture, wherein the controller is configured to transmit a first signal via the input terminal that is indicative of the electrical power consumed by at least the LED light source during operation of the lighting fixture.

(24) The lighting fixture of configuration (23), wherein the first signal contains information for a look-up table, the information identifying amounts of power consumed by the lighting fixture for corresponding operational settings of the lighting fixture.

(25) The lighting fixture of configuration (23) or (24), wherein the first signal is transmitted to indicate whether the lighting fixture operates within a power classification and wherein the controller is configured to transmit the first signal multiple times per second.

(26) The lighting fixture of any one of configurations (23) through (24), wherein the controller is further configured to: identify a blanking command received by the transceiver via the input terminal; control the lighting fixture to discontinue drawing power from the input terminal for a period of time in response to receipt of the blanking command; and control the lighting fixture to resume drawing the power from the input terminal after the period of time is passed to indicate via the input terminal that the lighting fixture is compatible with an external power supply.

(27) The lighting fixture of configuration (26), wherein the period of time is no longer than 10 ms.

(28) The lighting fixture of any one of configurations (23) through (27), wherein the controller is further configured to: detect a drop-out in power at the input terminal having a predetermined duration; control the lighting fixture to discontinue drawing power from the input terminal for a period of time in response to detecting the drop-out in power; and control the lighting fixture to resume drawing the power from the input terminal after the period of time is passed to indicate via the input terminal that the lighting fixture is compatible with an external power supply.

(29) The lighting fixture of any one of configurations (23) through (28), wherein the controller is further configured to: receive a query requesting identification information via the input terminal; transmit, via the transceiver, a response to the query that includes information indicating that the lighting fixture is compatible with operating under a power-monitoring condition, wherein the power-monitoring condition requires providing an indication of power consumption by the lighting fixture while the lighting fixture is operating.

(30) The lighting fixture of any one of configurations (23) through (29), wherein the controller is further configured to: receive a second signal via the input terminal; control the LED driver to change an intensity of light output from the LED light source in response to the second signal; receive a third signal via the input terminal; and control the LED driver to change a color temperature of the light output from the LED light source in response to the third signal.

(31) A method of operating a lighting fixture, the method comprising: receiving, at an input terminal (304), power from a low-voltage power supply; providing current, with an LED driver (230, 322), to an LED light source (210); controlling, with a controller (250), an amount of the current provided by the LED driver to the LED light source; emitting light with the LED light source (210); measuring, with power metering circuitry (340), a first amount indicative of electrical power consumed by at least the LED light source; and transmitting, with a transceiver (240) communicatively coupled to the controller and to the input terminal, a first signal via the input terminal that is indicative of the electrical power consumed by at least the LED light source during operation of the lighting fixture.

(32) The method of (31), wherein the first signal contains information for a look-up table, the information identifying amounts of power consumed by the lighting fixture for corresponding operational settings of the lighting fixture.

(33) The method of (31) or (32), further comprising: transmitting the first signal multiple times per second, wherein the first signal is transmitted to indicate whether the lighting fixture operates within a power classification.

(34) The method of any one of (31) through (33), further comprising: identifying, by the controller, a blanking command received by the transceiver via the input terminal; controlling the lighting fixture to discontinue drawing power from the input terminal for a period of time in response to receipt of the blanking command; and controlling the lighting fixture to resume drawing the power from the input terminal after the period of time is passed to indicate via the input terminal that the lighting fixture is compatible with an external power supply.

(35) The method of (34), wherein the period of time is no longer than 10 ms.

(36) The method of any one of (31) through (35), further comprising: detecting, by the controller, a drop-out in power at the input terminal having a predetermined duration; controlling the lighting fixture to discontinue drawing power from the input terminal for a period of time in response to detecting the drop-out in power; and controlling the lighting fixture to resume drawing the power from the input terminal after the period of time is passed to indicate via the input terminal that the lighting fixture is compatible with an external power supply.

(37) The method of any one of (31) through (36), further comprising: receiving, via the transceiver, a query requesting identification information via the input terminal; transmitting, via the transceiver, a response to the query that includes information indicating that the lighting fixture is compatible with operating under a power-monitoring condition, wherein the power-monitoring condition requires providing an indication of power consumption by the lighting fixture while the lighting fixture is operating.

(38) The method of any one of (31) through (37), further comprising: receiving, via the transceiver, a second signal via the input terminal; controlling, by the controller, the LED driver to change an intensity of light output from the LED light source in response to the second signal; receiving, via the transceiver, a third signal via the input terminal; and controlling, by the controller, the LED driver to change a color temperature of the light output from the LED light source in response to the third signal.

(39) A wiring hub (130) for low-voltage LED lighting, the wiring hub comprising: an input (305) to receive power according to a first power classification, the first power classification allowing more than 100 watts of power flowing into the input; a first power supply (117) coupled to the input and coupled to a first output of the wiring hub to output power according to a second power classification, the second power classification allowing no more than 100 watts to the first output; a second power supply (117) coupled to the input and coupled to a second output of the wiring hub to output power according to a second power classification, the second power classification allowing no more than 100 watts to the second output; and at least one transceiver communicatively coupled to the first output to transmit a signal received at the input to the output.

(40) The wiring hub of configuration (39), wherein: the first power classification is according to United States National Electrical Code Class 1 criterion; and the second power classification is according to United States National Electrical Code Class 2 criterion.

(41) The wiring hub of configuration (39) or (40), wherein the signal contains information to control at least one of an intensity of light emitted from an LED lighting fixture or a color temperature of the light emitted from the LED lighting fixture.

(42) A method of distributing power for low-voltage LED lighting with a wiring hub, the method comprising: receiving, at an input (305) of the wiring hub, power according to a first power classification, the first power classification allowing more than 100 watts of power flowing into the input; providing, with a first power supply (117) coupled to the input and coupled to a first output of the wiring hub, output power according to a second power classification, the second power classification allowing no more than 100 watts provided to the first output; and providing, with a second power supply (117) coupled to the input and coupled to a second output of the wiring hub, output power according to a second power classification, the second power classification allowing no more than 100 watts provided to the second output.

(43) The method of (42), further comprising: receiving, at an input (305) of the wiring hub, a first signal; and transmitting, from the first output, a second signal in response to receiving the first signal.

(44) The method of (43), wherein the second signal contains information to control at least one of an intensity of light emitted from an LED lighting fixture or a color temperature of the light emitted from the LED lighting fixture.

(45) The method of any one of (42) through (43), wherein: the first power classification is according to United States National Electrical Code Class 1 criterion; and the second power classification is according to United States National Electrical Code Class 2 criterion.

(46) A communication coupler (530) for an outdoor LED lighting system, the communication coupler comprising: an input to receive power from a transformer; a first transceiver (532) to communicatively couple to an output low-voltage power line (505), the low-voltage power line configured to deliver power to at least one LED lighting fixture (510); a second transceiver (534) to communicatively couple to an indoor lighting system; and a controller (550) communicatively coupled to the first transceiver and the second transceiver, wherein the controller is configured to: receive a first signal via the second transceiver; output a second signal via the first transceiver to change an intensity of light output from the LED lighting fixture in response to the first signal; receive a third signal via the second transceiver; and output a fourth signal via the first transceiver to change a color temperature of the light output from the LED lighting fixture in response to the third signal.

(47) The communication coupler of configuration (46), further including a power supply (400) comprising: a power source (420) to output electrical current to the low-voltage power line to power a first LED lighting fixture of the at least one LED lighting fixture; and power metering circuitry (340) to sense at least one of the electrical current or first electrical power delivered to the low-voltage power line, wherein the controller is communicatively coupled to the power metering circuitry and the power source and is further configured to: determine a first amount that is indicative of the first electrical power delivered from the power source to the low-voltage power line to power at least the first LED lighting fixture when the LED lighting fixture is operating and coupled to the low-voltage power line; determine a second amount that is indicative of second electrical power consumed by at least the first LED lighting fixture when the first LED lighting fixture is operating and coupled to the low-voltage power line; compare the first amount to the second amount; and if the first amount differs from the second amount by more than a predetermined threshold amount, limit the first electrical power to a predetermined power level.

(48) A method of operating a communication coupler (530) for an outdoor LED lighting system, the method comprising: receiving, at the communication coupler, first power from a transformer; providing, to an output low-voltage power line (505), second power to at least one LED lighting fixture (510) coupled to the low-voltage power line; communicatively coupling to the low-voltage power line with a first transceiver (532); communicatively coupling to an indoor lighting system with second transceiver (534); receiving, with a controller (550) communicatively coupled to the first transceiver and the second transceiver, a first signal via the second transceiver; transmitting a second signal over the low-voltage power line, via the first transceiver, to change an intensity of light output from the LED lighting fixture in response to the first signal; receiving a third signal via the second transceiver; and transmitting a fourth signal over the low-voltage power line, via the first transceiver, to change a color temperature of the light output from the LED lighting fixture in response to the third signal.

(49) The method of (48), wherein the communication coupler includes a power supply, the method further comprising: determining, by the controller, a first amount that is indicative of a first electrical power delivered by the power supply to the low-voltage power line to power the at least one LED lighting fixture; comparing the first amount with a second amount that is indicative of second electrical power consumed by the at least one LED lighting fixture while operating; and if the first amount differs from the second amount by more than a predetermined threshold amount, limiting the first electrical power to a predetermined power level.

(50) The method of (49), wherein the predetermined power level is no larger than 100 watts.

6. Conclusion

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been described. The acts performed as part of the method may be ordered in any suitable way. Accordingly, implementations may be constructed in which acts are performed in an order different than illustrated, which may include performing some acts simultaneously, even though shown as sequential acts in illustrative implementations.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A power supply comprising:

a power source to output electrical current;

an output terminal coupled to the power source to provide the electrical current to a device when the device is coupled to the output terminal to receive power from the power source;

power metering circuitry to sense at least one of the electrical current or first electrical power delivered to the output terminal; and a controller communicatively coupled to the power metering circuitry and the power source, wherein the controller is configured to:

determine a first amount that is indicative of the first electrical power delivered from the power source to the output terminal to power at least the device when the device is operating and coupled to the output terminal;

compare the first amount to a second amount, wherein the second amount is indicative of second electrical power consumed by at least the device when the device is operating and coupled to the output terminal; and if the first amount differs from the second amount by more than a predetermined threshold amount, limit the first electrical power to a predetermined power level.

2. The power supply of claim 1, wherein:

the predetermined power level is no larger than 100 watts and a voltage provided to the output terminal by the power supply is no greater than 60 volts; and the controller is further configured to:

control the power source to deliver from 100 watts to 500 watts of electrical power to the output terminal if the first amount does not differ from the second amount by more than the predetermined threshold amount.

3. The power supply of claim 1, further comprising a transceiver communicatively coupled to the output terminal to transmit signals via the output terminal and receive signals via the output terminal, wherein the controller is further configured to:

send first signals to the device via the transceiver to control the device, when the device is coupled to the output terminal and operating;

receive a second signal from the device via the transceiver, the second signal indicative of third electrical power consumed by the device; and determine the second amount based, at least in part, on the second signal.

4. The power supply of claim 3, wherein the device is an LED lighting fixture and the first signals control at least one of intensity of light output from the LED lighting fixture or color temperature of the light output from the LED lighting fixture.

5. The power supply of claim 4 in combination with the LED lighting fixture, wherein the controller is a first controller, the transceiver is a first transceiver, and the lighting fixture comprises:

a second transceiver coupled to a low-voltage power line; and a second controller communicatively coupled to the second transceiver, the second controller configured to:

receive the first signals via the second transceiver; and control at least one of the intensity of the light output from the LED lighting fixture or the color temperature of the light output from the LED lighting fixture based on information included in the first signals.

6. The power supply of claim 5, wherein the second controller is further configured to:

determine at least one of current or power consumed by the LED lighting fixture; and transmit to the power supply the second signal.

7. The power supply of claim 3, wherein the device is a first device and the controller is further configured to:

send third signals to a second device via the transceiver to control the second device, when the second device is coupled to the output terminal and operating;

receive a fourth signal from the second device via the transceiver, the fourth signal indicative of fourth electrical power consumed by the second device; and determine the second amount based, at least in part, on the second signal and the fourth signal.

8. The power supply of claim 1, wherein the controller is further configured to determine the second amount based, at least in part, on information stored in memory and accessible to the controller, the information identifying power consumption of the device as a function of settings for the device.

9. The power supply of claim 8, wherein the information is stored in a look-up table.

10. The power supply of claim 1, wherein the controller is further configured to:

initiate a temporary suspension of the first electrical power delivered to the output terminal;

determine from a time interval following the suspension whether power is being drawn from the output terminal during the time interval; and if power is being drawn from the output terminal during the time interval, limit the first electrical power to the predetermined power level.

11. The power supply of claim 1, further comprising a transceiver communicatively coupled to the output terminal to transmit signals via the output terminal and receive signals via the output terminal, wherein the controller is further configured to:

issue a query command via the output terminal;

receive in response to the query command, via the output terminal, identification information for the device; and if no or non-compliant identification information for the device is received, limit the first electrical power to the predetermined power level.

12. The power supply of claim 1, further comprising:

a power converter configured to receive input electrical power of a first form and produce output electrical power of a second form, the second form differing from the first form in at least one of voltage or maximum power provided on a single power line.

13. The power supply of claim 12 included in a wiring hub, the wiring hub comprising:

an input to receive the input electrical power of the first form classified according to United States National Electrical Code Class 1 criterion; and the power supply of claim 1 arranged to receive the input electrical power and provide at its output port output electrical power of a second form classified according to United States National Electrical Code Class 2 criterion.

14. A method of operating a power supply, the method comprising:

outputting electrical current with a power source;

delivering, to an output terminal coupled to the power source, the electrical current to provide first electrical power to a device coupled to the output terminal;

sensing, with power metering circuitry, at least one of the electrical current or the first electrical power delivered to the output terminal;

determining, with a controller communicatively coupled to the power metering circuitry, a first amount that is indicative of the first electrical power delivered to the output terminal to power at least the device;

comparing the first amount to a second amount, wherein the second amount is indicative of second electrical power consumed by at least the device; and if the first amount differs from the second amount by more than a predetermined threshold amount, limiting the first electrical power to a predetermined power level.

15. The method of claim 14, wherein the predetermined power level is no larger than 100 watts and a voltage provided to the output terminal by the power supply is no greater than 60 volts, the method further comprising:

controlling, by the controller, the power source to deliver from 100 watts to 500 watts of electrical power to the output terminal if the first amount does not differ from the second amount by more than the predetermined threshold amount.

16. The method of claim 14, further comprising:

transmitting, with a transceiver that is communicatively coupled to the controller, first signals to the device to control the device;

receiving, via the transceiver, a second signal from the device that is indicative of third electrical power consumed by the device; and determining, by the controller, the second amount based, at least in part, on the second signal.

17. The method of claim 16, wherein the device is an LED lighting fixture and the first signals control at least one of intensity of light output from the LED lighting fixture or color temperature of the light output from the LED lighting fixture.

18. The method of claim 17, wherein the controller is a first controller, the transceiver is a first transceiver, and the method further comprises:

receiving the first signals via a second transceiver at the LED lighting fixture; and controlling, with a second controller at the LED lighting fixture, at least one of the intensity of the light output from the LED lighting fixture or the color temperature of the light output from the LED lighting fixture based on information included in the first signals.

19. The method of claim 18, further comprising:

determining, with the second controller, at least one of current or power consumed by the LED lighting fixture; and transmitting, by the second transceiver, the second signal to the power supply.

20. The method of claim 16, wherein the device is a first device, the method further comprising:

sending, via the transceiver, third signals to a second device to control the second device;

receiving, via the transceiver, a fourth signal from the second device, the fourth signal indicative of fourth electrical power consumed by the second device; and determining, by the controller, the second amount based, at least in part, on the second signal and the fourth signal.

21. The method of claim 14, further comprising:

determining, by the controller, the second amount based, at least in part, on information stored in memory and accessible to the controller, the information identifying power consumption of the device as a function of settings for the device.

22. The method of claim 21, wherein the determining comprises accessing a look-up table.

* * * * *